US012559599B2

(12) United States Patent     (10) Patent No.:   US 12,559,599 B2

McLeod et al.     (45) Date of Patent:    Feb. 24, 2026

---

(54) THIN SINGLE-SITE CATALYZED POLYMER SHEETS

(71) Applicant: Fina Technology, Inc., Houston, TX (US)

(72) Inventors: Michael McLeod, Houston, TX (US); Fengkui Li, Houston, TX (US); Russell McDonald, Humble, TX (US)

(73) Assignee: Fina Technology, Inc., Houston, TX (US)

( * ) Notice: Subject to any disclaimer, the term of this patent is extended or adjusted under 35 U.S.C. 154(b) by 683 days.

(21) Appl. No.: 17/729,682

(22) Filed: Apr. 26, 2022

(65) Prior Publication Data

US 2022/0340723 A1     Oct. 27, 2022

Related U.S. Application Data

(60) Provisional application No. 63/179,873, filed on Apr. 26, 2021.

(51) Int. Cl.
| | |
|---|---|
| *C08J 5/18* | (2006.01) |
| *B65D 71/50* | (2006.01) |
| *C08L 23/06* | (2006.01) |
| *C08L 23/12* | (2006.01) |
| *C08L 23/16* | (2006.01) |

(52) U.S. Cl.
CPC .............. *C08J 5/18* (2013.01); *B65D 71/504* (2013.01); *C08L 23/06* (2013.01); *C08L 23/12* (2013.01); *C08L 23/16* (2013.01); *C08J 2323/06* (2013.01); *C08J 2323/12* (2013.01);

*C08J 2323/16* (2013.01); *C08L 2207/066* (2013.01); *C08L 2314/06* (2013.01)

(58) Field of Classification Search
CPC ......... B65D 71/50; C08L 23/06; C08L 23/08; C08L 23/0807; C08L 23/0815; C08L 23/10; C08L 23/12; C08L 23/14; C08L 23/142; C08L 23/16
See application file for complete search history.

(56) References Cited

U.S. PATENT DOCUMENTS

| | | |
|---|---|---|
| 4,530,914 A | 7/1985 | Ewen et al. |
| 4,542,199 A | 9/1985 | Kaminsky et al. |
| 4,543,399 A | 9/1985 | Jenkins et al. |
| 4,588,790 A | 5/1986 | Jenkins et al. |
| 4,665,208 A | 5/1987 | Welborn et al. |
| 4,794,096 A | 12/1988 | Ewen |
| 4,808,561 A | 2/1989 | Welborn |
| 4,871,705 A | 10/1989 | Hoel |
| 4,874,734 A | 10/1989 | Kioka et al. |
| 4,908,463 A | 3/1990 | Bottelberghe |
| 4,924,018 A | 5/1990 | Bottelberghe |

(Continued)

FOREIGN PATENT DOCUMENTS

| | | |
|---|---|---|
| EP | 0277003 A1 | 8/1988 |
| EP | 0277004 A1 | 8/1988 |

(Continued)

*Primary Examiner* — Zachary M Davis

(74) *Attorney, Agent, or Firm* — BUCHANAN INGERSOLL & ROONEY PC

(57) ABSTRACT

Thin polymer sheets and used thereof are described. A polymer sheet can include greater than 90 wt. % of a single-site catalyzed polyolefin (PO) and have a thickness of at least 0.0254 cm. The sheet can be used to produce molded articles.

22 Claims, 9 Drawing Sheets

(56) References Cited

U.S. PATENT DOCUMENTS

| | | | |
|---|---|---|---|
| 4,931,417 A | 6/1990 | Miya et al. |
| 4,933,403 A | 6/1990 | Kaminsky et al. |
| 4,937,299 A | 6/1990 | Ewen et al. |
| 4,952,540 A | 8/1990 | Kioka et al. |
| 4,968,827 A | 11/1990 | Davis |
| 4,975,403 A | 12/1990 | Ewen |
| 5,017,714 A | 5/1991 | Welborn |
| 5,026,798 A | 6/1991 | Canich |
| 5,028,670 A | 7/1991 | Chinh et al. |
| 5,057,475 A | 10/1991 | Canich et al. |
| 5,091,352 A | 2/1992 | Kioka et al. |
| 5,103,031 A | 4/1992 | Smith |
| 5,120,867 A | 6/1992 | Welborn |
| 5,132,381 A | 7/1992 | Winter et al. |
| 5,145,819 A | 9/1992 | Winter et al. |
| 5,155,180 A | 10/1992 | Takada et al. |
| 5,198,401 A | 3/1993 | Turner et al. |
| 5,204,419 A | 4/1993 | Tsutsui et al. |
| 5,206,199 A | 4/1993 | Kioka et al. |
| 5,235,081 A | 8/1993 | Sangokoya |
| 5,239,022 A | 8/1993 | Winter et al. |
| 5,243,001 A | 9/1993 | Winter et al. |
| 5,248,801 A | 9/1993 | Sangokoya |
| 5,276,208 A | 1/1994 | Winter et al. |
| 5,278,119 A | 1/1994 | Turner et al. |
| 5,296,434 A | 3/1994 | Karl et al. |
| 5,304,614 A | 4/1994 | Winter et al. |
| 5,308,815 A | 5/1994 | Sangokoya |
| 5,317,036 A | 5/1994 | Brady et al. |
| 5,324,800 A | 6/1994 | Welborn et al. |
| 5,329,032 A | 7/1994 | Tran et al. |
| 5,329,033 A | 7/1994 | Spaleck et al. |
| 5,350,723 A | 9/1994 | Neithamer et al. |
| 5,352,749 A | 10/1994 | DeChellis et al. |
| 5,374,752 A | 12/1994 | Winter et al. |
| 5,391,790 A | 2/1995 | Rohrmann et al. |
| 5,405,922 A | 4/1995 | DeChellis et al. |
| 5,436,304 A | 7/1995 | Griffin et al. |
| 5,436,305 A | 7/1995 | Alt et al. |
| 5,455,366 A | 10/1995 | Rohrmann et al. |
| 5,462,999 A | 10/1995 | Griffin et al. |
| 5,510,502 A | 4/1996 | Sugano et al. |
| 5,525,678 A | 6/1996 | Mink et al. |
| 5,532,396 A | 7/1996 | Winter et al. |
| 5,543,373 A | 8/1996 | Winter et al. |
| 5,554,704 A | 9/1996 | Burkhardt et al. |
| 5,616,661 A | 4/1997 | Eisinger et al. |
| 5,627,242 A | 5/1997 | Jacobsen et al. |
| 5,635,437 A | 6/1997 | Burkhardt et al. |
| 5,643,847 A | 7/1997 | Walzer |
| 5,665,818 A | 9/1997 | Tilston et al. |
| 5,668,228 A | 9/1997 | Chinh et al. |
| 5,672,668 A | 9/1997 | Winter et al. |
| 5,677,375 A | 10/1997 | Rifi et al. |
| 6,087,291 A | 7/2000 | Speca et al. |
| 6,100,214 A | 8/2000 | Walzer et al. |
| 6,114,479 A | 9/2000 | Speca et al. |
| 6,117,955 A | 9/2000 | Agapiou et al. |
| 6,124,230 A | 9/2000 | Speca et al. |
| 6,140,432 A | 10/2000 | Kyriacos et al. |
| 6,143,686 A | 11/2000 | Vizzini et al. |
| 6,147,173 A | 11/2000 | Holtcamp |
| 6,180,735 B1 | 1/2001 | Wenzel |
| 6,194,341 B1 | 2/2001 | Canich et al. |
| 6,207,606 B1 | 3/2001 | Lue et al. |
| 6,211,105 B1 | 4/2001 | Holtcamp |
| 6,218,558 B1 | 4/2001 | Kato et al. |
| 6,228,795 B1 | 5/2001 | Vizzini |
| 6,242,545 B1 | 6/2001 | Jejelowo et al. |
| 6,245,705 B1 | 6/2001 | Kissin |
| 6,245,706 B1 | 6/2001 | Hlatky |
| 6,245,868 B1 | 6/2001 | Agapiou et al. |
| 6,248,845 B1 | 6/2001 | Loveday et al. |
| 6,252,097 B1 | 6/2001 | Sugano et al. |
| 6,255,506 B1 | 7/2001 | Kuber et al. |
| 6,255,515 B1 | 7/2001 | Kato et al. |
| 6,271,323 B1 | 8/2001 | Loveday et al. |
| 6,274,684 B1 | 8/2001 | Loveday et al. |
| 6,300,436 B1 | 10/2001 | Agapiou et al. |
| 6,339,134 B1 | 1/2002 | Crowther et al. |
| 6,340,730 B1 | 1/2002 | Murray et al. |
| 6,346,586 B1 | 2/2002 | Agapiou et al. |
| 6,359,072 B1 | 3/2002 | Whaley |
| 6,376,407 B1 | 4/2002 | Burkhardt et al. |
| 6,376,408 B1 | 4/2002 | Burkhardt et al. |
| 6,376,409 B1 | 4/2002 | Burkhardt et al. |
| 6,376,410 B1 | 4/2002 | Burkhardt et al. |
| 6,376,411 B1 | 4/2002 | Burkhardt et al. |
| 6,376,412 B1 | 4/2002 | Burkhardt et al. |
| 6,376,413 B1 | 4/2002 | Kuchta et al. |
| 6,376,627 B1 | 4/2002 | Burkhardt et al. |
| 6,380,120 B1 | 4/2002 | Burkhardt et al. |
| 6,380,121 B1 | 4/2002 | Kuchta et al. |
| 6,380,122 B1 | 4/2002 | Kuchta et al. |
| 6,380,123 B1 | 4/2002 | Kuchta et al. |
| 6,380,124 B1 | 4/2002 | Burkhardt et al. |
| 6,380,328 B1 | 4/2002 | McConville et al. |
| 6,380,330 B1 | 4/2002 | Burkhardt et al. |
| 6,380,331 B1 | 4/2002 | Kuchta et al. |
| 6,380,334 B1 | 4/2002 | Kuchta et al. |
| 6,399,723 B1 | 6/2002 | Burkhardt et al. |
| 6,420,580 B1 | 7/2002 | Holtcamp et al. |
| 7,445,827 B2 | 11/2008 | Le et al. |
| 2004/0157075 A1 | 8/2004 | Yang |
| 2017/0101491 A1* | 4/2017 | Ishihama ................... C08J 5/18 |
| 2020/0317395 A1* | 10/2020 | Bayona Salazar ..... B65D 51/18 |
| 2021/0230323 A1* | 7/2021 | Lee ........................ C08F 110/02 |
| 2022/0282074 A1* | 9/2022 | Singh ................. C08L 23/0815 |

FOREIGN PATENT DOCUMENTS

| | | | |
|---|---|---|---|
| EP | 0279586 A2 | 8/1988 |
| EP | 0426637 A2 | 5/1991 |
| EP | 0500944 A1 | 2/1992 |
| EP | 0495375 A2 | 7/1992 |
| EP | 0520732 A1 | 12/1992 |
| EP | 0549900 A1 | 7/1993 |
| EP | 0561476 A1 | 9/1993 |
| EP | 0570982 A1 | 11/1993 |
| EP | 0573403 A2 | 12/1993 |
| EP | 0576970 A1 | 1/1994 |
| EP | 0594218 A1 | 4/1994 |
| EP | 0611773 A2 | 8/1994 |
| WO | 9200333 A2 | 1/1992 |
| WO | 9407928 A1 | 4/1994 |
| WO | 9410180 A1 | 5/1994 |
| WO | 9732906 A1 | 9/1997 |
| WO | 9822486 A1 | 5/1998 |
| WO | 0012565 A1 | 3/2000 |
| WO | 2014204460 A1 | 12/2014 |

* cited by examiner

THIN SINGLE-SITE CATALYZED POLYMER SHEETS

CROSS REFERENCE TO RELATED APPLICATIONS

None.

BACKGROUND OF THE INVENTION

A. Field of the Invention

The invention generally concerns thin polymer sheets that include single-site catalyzed polymers. In particular, the invention concerns a polymer sheet that includes greater than 90 wt. % of a single-site catalyzed polyolefin (PO). The polymer sheet can have a thickness of at least 0.0254 centimeters (cm), preferably 0.0254 cm to 0.1 cm.

B. Description of Related Art

Polyolefin films and sheets are used in a variety of consumer and commercial products. Traditionally films have a thickness of less than 0.0254 cm, and sheets have a thickness of 0.0254 cm or greater. Applications for thin sheets include container connectors for attaching a plurality of beverage containers, such as water, alcoholic beverages, or soft cans, are well known. Such connectors are typically thin flexible sheets of plastic that include a series of apertures. Each aperture is sized for receiving a portion of the can. For example, common "six-pack" connectors include six apertures that are each engageable about an upper ridge of a can. Similar connectors have been used to hold bottles, and non-fluid containers. By way of example, International Application Publication No. WO2014/204460 to Bougie et al. describes flexible beverage support sheets made from polymeric multilayer, polyolefin foamed sheets.

Other uses of polyolefin sheets include commercial products that include sheets that are pressed together in combination with other material (e.g., reinforcement materials). By way of example, U.S. Patent Application Publication No. 2004-157075 to Yang et al., describes polyolefin roofing membranes having a thickness of 0.0889 cm to 0.2286 cm (35 to 90 mil) and include reinforcement materials between thermoplastic layers that include 50 to 90 wt. % of a metallocene-catalyzed polyolefin (e.g., polyethylene and butene copolymer) and 10 to 50 wt. % additives.

Although polyolefin films and/or sheets are known, there is a need for polymer compositions that can be made into sheets that provide the desired properties while also allowing for the facile manufacture of the polymer sheets without adversely affecting the desired properties.

SUMMARY OF THE INVENTION

A discovery has been made that provides a solution to at least some of the problems associated with polymer sheets. The discovery is premised on a polymer sheet that includes greater than 90 wt. % of a single-site catalyzed polyolefin (PO). The discovery provides advantages in lightweighting due to superior physical properties of the polymer sheets, processing due to the minimal amount, or absence, of wax and/or low molecular weight species in the polymer sheets, and temperature resistance due to high densities of the polymer sheets. By way of example, the thin polymer sheets of the present invention can wholly or partially displace thick low density polyethylene (LDPE) sheets in lightweighting applications. In another example, LDPE grades can have a higher amount of low molecular weight species and wax than the thin polymer sheets of the present invention. Wax can cause processing problems, such as increased die lip buildup, which impacts downtime for production cost. Waxy species are more mobile and thereby have a greater potential to bloom or be extracted from the finished articles produced from LDPE. Further, organoleptic problems with polymers can come from a variety of sources, with waxes being one of them. In yet another example, the thin polymer sheets of the present invention can have temperature resistance (e.g., resist softening), which make them suitable for use in food packaging. Still further, the thin polymer sheets of the present invention can provide advantages for technology traditionally serviced through high melt flow rate (MFR) injection molding of LDPE and linear LDPE (LLDPE) (e.g., injection molded lidstock, or overcap lid molding), as the sheets of the present invention can be thermoformed.

In one aspect of the present invention, polymer sheets are described. A polymer sheet of the present invention can include greater than 90 wt. % of a single-site catalyzed polyolefin (PO) and have a thickness of at least 0.0254 cm. The PO material can include single-site catalyzed polyethylene (PE), a single-site catalyst polypropylene (PP), or a copolymer thereof, or a blend thereof. In some embodiments, the polymer sheet can include 90 wt. % of single-site catalyst PE and 10% or less of an additional polymer. Non-limiting examples of additional polymers can include single-site catalyzed PP, single-site catalyzed copolymers, single-site catalyzed plastomers, elastomers, non-single site catalyzed polyolefins, or a blend thereof. Non-single site catalyzed polyolefins can include a low density polyolefin material (e.g., LDPE or LDPP). In some embodiments, the polyolefin and/or polymer sheets of the present invention can have less than 30 wt. % of wax, less than 25 wt. %, less than 20 wt. % wax, less than 15 wt. % wax, less than 10 wt. % wax, less than 5 wt. % wax, less than 4 wt. % wax, less than 3 wt. % wax, less than 2 wt. % wax, less than 1 wt. % wax, or no wax. Properties of the sheet can include thickness, density, tensile modulus, tensile strength, tensile toughness, impact energy, % shrinkage, load, or combinations thereof. Sheet thickness can be at least 0.0254 cm, 0.0254 cm to 0.1 cm, or 0.0254 cm to 0.0762 cm, or 0.0254 to 0.0508 cm. The density of the sheet can be at least 0.918 g/mL, or 0.918 g/mL to 0.942 g/mL, or 0.924 g/mL to 0.936 g/mL. An average tensile modulus of the polymer sheet of the present invention can be at least 200 MPa, or 300 MPa to 1300 MPa, or 350 MPa to 800 MPa, or 360 MPa. The sheet can have an average tensile strength at yield greater than an average tensile strength at yield of a low density polyethylene sheet (LDPE) at the same thickness. By way of example, the polymer sheet of the present invention can have an average tensile strength at maximum of at least 18.7 MPa, or at least 42 MPa. An average tensile toughness of the polymer sheet of the present invention can be at least 25 MPa, or 50 MPa to 400 MPa, or 55 to 250 MPa. In some embodiments, the polymer sheet of the present invention can have a thickness of 0.0254 cm and an impact energy at 23° C. of greater than 1.5 kJ/m, or greater than 2.5 kJ/m, or at least 3.0 kJ/m, and/or an impact energy at −20° C. of 2.5 kJ/m, or greater than 3.5 kJ/m, or at least 4.5 kJ/m. The polymer sheet of the present invention can have a % shrinkage≤the % shrinkage of a LDPE sheet of the same thickness under the same conditions, a higher energy to maximum load than a LDPE sheet of the same thickness under the same conditions, a heat deflection temperature (HDT) performance greater than the HDT of a LDPE sheet of the same thickness under the same conditions, or any combination thereof.

In a further aspect of the present invention, articles of manufacture that include the metallocene polymer sheet of present invention are described. The article of manufacture can include a molded material (e.g., multi-container ring holder, a four-pack ring, a six-pack ring, a twelve-pack ring, or an overlid).

In yet another aspect of the present invention methods of making the polymer sheets of the present invention are described. A method can include subjecting a single-site catalyzed polymer having a melt flow index from 0.1 to 10 decigram/min (dg/min), 0.25 to 7.5 dg/min, or 0.4 to 5.7 dg/min, and a density of at least 0.918 g/mL, 0.918 g/mL to 0.942 g/mL, or 0.924 g/mL to 0.936 g/mL, to conditions suitable to produce a sheet having a thickness of at least 0.0254 cm (e.g., 0.0254 cm to 0.1 cm, 0.0254 cm to 0.0762 cm, or 0.0254 cm to 0.0508 cm). The conditions can include extruding the single-site catalyzed polymer at a temperature of 175° C. to 260° C., or 200° C. to 235° C.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment or aspect discussed herein can be combined with other embodiments or aspects discussed herein and/or implemented with respect to any method or composition of the invention, and vice versa. Furthermore, compositions of the invention can be used to achieve methods of the invention.

The following includes definitions of various terms and phrases used throughout this specification.

Shrinkage can be calculated by first measuring the length of contraction upon cooling in the in-flow direction (termed longitudinal direction when measuring differential shrinkage) and the length of contraction occurring in the cross-flow direction (termed transverse direction when measuring differential shrinkage). The difference in the in-flow and cross-flow contractions multiplied by 100% gives the percent shrinkage. Measurements of shrinkage are limited to measuring the changes in the direction of resin flow and in a direction perpendicular to the direction of resin flow. Shrinkage can be measured using an optical device as described in U.S. Pat. No. 7,445,827 or a computerized numerical control (CNC) microscope. An example of a CNC microscope is a QV APEX 302 (Mitutoyo, USA). The polymeric specimen can be a 60×60×2 mm polymeric specimen formed in accordance with ISO 294-3 type D2 mold from polymeric compositions of this disclosure. An optical measurement of the specimen length is performed by placing the polymeric specimen on a positioning table and setting the positioning table under a microscope camera that is in communication with a microprocessor. The position of both edges of a polymeric specimen is recorded at the start and end of a period of time with the help of a specific mark on a display screen of the microprocessor. The specimen length or width is subsequently deduced from the change in position observed over the period of time. The processing parameters for shrinkage measurements are based on ISO 294-3 and ISO 294-1 with two noticeable differences: (1) the holding pressure can be chosen on the same material from 20 MPa, 40 MPa, 60 MPa or 80 MPa and (2) the holding time is kept to a minimum.

The phrases "melt flow rate" or "melt index (MFR or MI2)" refer to the measurement of the ease of flow of the melt of a thermoplastic polymer or blend. Herein "melt flow rate" or MFR is used for polypropylene and "melt index" or "MI2" is used for polyethylene and polyethylene-rich blends. MFR values referred to herein are those determined according to ASTM D 1238 at a temperature of 230° C. with a ram weight of 2.16 kg. MFR measurements reported herein were conducted using a Tinuius-Olsen (USA) MP1200 melt flow indexer. MI2 values referred to herein are those determined according to ASTM D1238 at a temperature of 190° C. with a ram weight of 2.16 kg. MI2 measurements reported herein were conducted using a Tinuius-Olsen MP993 melt flow indexer.

"Density" is defined as weight per volume. Density can be determined by ISO 1183.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The polymer sheets of the present invention can "comprise," "consist essentially of," or "consist of" particular ingredients, components, compositions, etc. disclosed throughout the specification. With respect to the transitional phrase "consisting essentially of," in one non-limiting aspect, a basic and novel characteristic of the polymer sheets is that they include greater than 90 wt. % of a single-site catalyzed PO and have a thickness of at least 0.0254 cm.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

Figure 1:
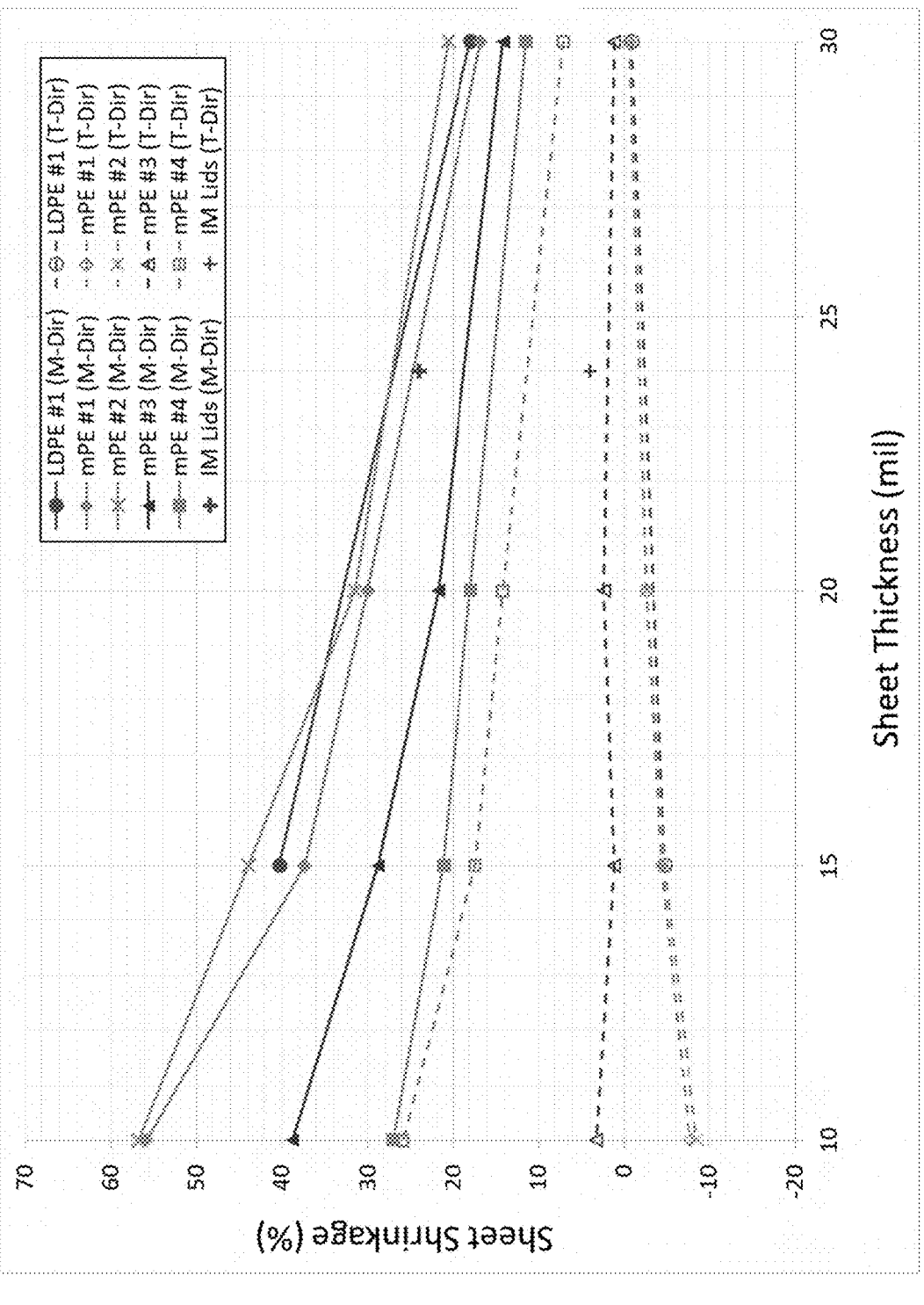
FIG. 1 shows the comparison of sheet thickness and % sheet shrinkage for the comparative LDPE sheet, the polymer sheets of the present invention, and an injection molded (IM) lids.

While the invention is susceptible to various modifications and alternative forms, specific embodiments thereof are shown by way of example in the drawings. The drawings may not be to scale.

DETAILED DESCRIPTION OF THE INVENTION

A discovery has been made that provides a solution to at least some of the problems associated with polyolefin-based sheets. The discovery is premised on a polymer sheet that includes greater than 90 wt. % of a single-site catalyzed polyolefin, and the sheet has a thickness of at least 0.0254 cm. The polymer sheet provides advantages in lightweight, production of articles of manufacture, and thermal resistance.

These and other non-limiting aspects of the present invention are discussed in further detail in the following sections.
A. Polymer Sheets The polymer sheets of the present invention can include greater than 90 wt. % of a single-site catalyzed polyolefin. In some embodiments, the polymer sheets can include at least any one of, equal to any one of, or between any two of 90, 91, 92, 93, 94, 95, 96, 97, 98, 99, and 100 wt. % of single-site catalyst PE and less than any one of, equal to any one of, or between any two of 10, 9, 8, 7, 6, 5, 4, 3, 2, 1 wt. % of an additional polymer. Non-limiting examples of additional polymers can include single-site catalyzed PP, a single-site catalyzed copolymer, single-site catalyzed plastomers, an elastomer, non-single site catalyzed polyolefin, or a blend thereof. Non-single site catalyzed polyolefin can be a low density polyolefin material. Non-limiting examples of low density polyolefin material include LDPE, LDPP, LLDPE or any combination thereof. In some embodiments, the polyolefin and/or the polymer sheets of the present invention can have less than 30 wt. % of wax, or less than any one of, equal to any one of, or between any two of 30, 29, 28, 27, 26, 25, 24, 23, 22, 21, 20, 19, 18, 17, 16, 15, 14, 13, 12, 10, 9, 8, 7, 6, 5, 4, 3, 2, 1, or 0 wt. %.

Properties of the polymer sheet of the present invention can include thickness, density, tensile modulus, tensile strength, tensile toughness, impact energy, % shrinkage, load, or combinations thereof. Sheet thickness can be from 0.0254 cm to 0.1 cm, or at least any one of, equal to any one of, or between any two of 0.0254, 0.0260, 0.0270, 0.0280, 0.0290, 0.030, 0.035, 0.040, 0.045, 0.050, 0.055, 0.060, 0.065, 0.070, 0.075, 0.080, 0.085, 0.090, 0.095, and 0.1 cm. The density of the sheet can be at least 0.918 g/mL, or at least any one of, equal to any one of, or between any two of 0.918, 0.920, 0.925, 0.930, 0.935, and 0.940 g/mL. An average tensile modulus of the polymer sheet of the present invention can be at least 200 MPa, or at least any one of, equal to any one of, or between any two of 200, 300, 400, 500, 600, 700, 800, 900, 1000, 1100, 1200, and 1300 MPa. An average tensile strength at yield greater than an average tensile strength at yield of a low density polyethylene sheet (LDPE) at the same thickness. By way of example, the polymer sheet of the present invention can have an average tensile strength at maximum of at least 18.7 MPa, or at least any one of, or equal to any one of, or between any two of 18.7 MPa, 19 MPa, 20, MPa, 25 MPa, 30 MPa, 35 MPa, 40 MPa, 45 MPa, 50 MPa, 55 MPa, 60 MPa, 65 MPa, 70 MPa, or greater. An average tensile toughness of the polymer sheet of the present invention can be at least 25 MPa, or at least any one of, or equal to any one of, or between any two of 25 MPa, 50 MPa, 100 MPa, 150 MPa, 200 MPa, 250 MPa, 300 MPa, 350 MPa, 400 MPa, and 450 MPa. In some embodiments, the polymer sheet can have 1) a thickness of 0.0254 cm to 0.1 cm, or 0.0254 cm to 0.0762 cm, or 0.0254 to 0.0508 cm, 2) a density of at least 0.918 g/mL, or 0.918 g/mL to 0.942 g/mL, or 0.924 g/mL to 0.936 g/mL, 3) an average tensile modulus of at least 200 MPa, or 300 MPa to 1300 MPa, or 350 MPa to 800 MPa, or 360 MPa, 4) an average tensile strength at maximum of at least 18.7 MPa, or at least 42 MPa, 5) an average tensile toughness of at least 25 MPa, or 50 MPa to 400 MPa, or 55 to 250 MPa, or any combination thereof. In some embodiments, the polymer sheet of the present invention can have a thickness of 0.0254 cm and an impact energy at 23° C. of greater than 1.5 kJ/m, or greater than 2.5 kJ/m, or at least 3.0 kJ/m, and/or an impact energy at −20° C. of 2.5 kJ/m, or greater than 3.5 kJ/m, or at least 4.5 kJ/m. The polymer sheet of the present invention can have a % shrinkage≤the % shrinkage of a LDPE sheet of the same thickness under the same conditions, a higher energy to maximum load than a LDPE sheet of the same thickness under the same conditions, a heat deflection temperature (HDT) performance greater than the HDT of a LDPE sheet of the same thickness under the same conditions, or any combination thereof.
B. Method of Producing the Polymer Sheet The preparation of the polymer sheet can be carried out using an extruder or other known sheet processing equipment. In certain aspects, the process can be carried out in an extruder by introducing the additives or additional polymer to the single-site catalyst polyolefin during processing. Non-limiting examples of extruder can include single-screw extruders, contra-rotating and co-rotating twin-screw extruders, planetary-gear extruders, ring extruders, or co-kneaders. In some embodiments, the additional polymer or additives can be obtained and mixed with the single-site catalyzed polyolefin prior to extrusion to produce a polymer blend. The single-site catalyzed polyolefin, and optional ingredients thereof can be subjected to an elevated temperature for a sufficient period of time to incorporate the optional ingredients to incorporate the optional ingredients with the single-site catalyzed polyolefin. The blending temperature can be above the softening point of the polymers. In certain aspects, a process can be performed at a temperature from about 160° C. to 280° C. Such "melt mixing" or "melt compounding" results in uniform dispersion of the optional additives in the single-site catalyzed polyolefin polymer matrix.

In a specific embodiment, the polymer sheet of the present invention can be prepared by subjecting a single-site catalyzed polymer having a melt flow index from 0.1 to 10 decigram/min (dg/min), 0.25 to 7.5 dg/min, or 0.4 to 5.7 dg/min, and a density of at least 0.918 g/mL, 0.918 g/mL to 0.942 g/mL, or 0.924 g/mL to 0.936 g/mL, to conditions suitable to produce a sheet having a thickness of at least 0.0254 cm. The conditions can include extruding the single-site catalyzed polymer at a temperature of at least any one of, equal to any one of or between any two of 175, 180, 185, 190, 195, 200, 210, 215, 220, 225, 230, 235, 240, 245, 250, 255, and 260° C.

C. Single-Site Catalyzed Polymer

The single-site catalyst polymer can be any single-site catalyzed polyolefin having a melt flow index from at least any one of, equal to any one of, or between any two of 0.1, 0.5, 1, 1.5, 2, 2.5, 3, 3.5, 4, 4.5, 5, 5.5, 6, 6.5, 7, 7.5, 8, 8.5, 9, 9.5 and 10 dg/min and a density of at least any one of, equal to any one of, or between any two of 0.918, 0.920, 0.925, 0.930, 0.935, 0.940, 0.945 g/mL.

a. Polyolefins

Non-limiting examples of polyolefins include polypropylenes and polyethylenes. Polyethylenes can include homopolymers of ethylene or copolymers of ethylene with at least one alpha olefin (e.g., butene, hexene, octene and the like). Non-limiting examples of polyethylenes include low density polyethylene (LDPE), a linear low density polyethylene (LLDPE), a medium density polyethylene (MDPE), a high density polyethylene (HDPE), an ethylene copolymer, or blends thereof. Polypropylenes include homopolymers of propylene, copolymers of propylene and other olefins, and terpolymers of propylene, ethylene, and dienes. A controlled rheology grade polypropylene (CRPP) is one that has been further processed (e.g., through a degradation process) to produce a polypropylene polymer with a targeted high melt flow index (MFI), lower molecular weight, and/or a narrower molecular weight distribution than the starting polypropylene. Reactor grade also termed low order polypropylene can be used. A polyolefin homopolymer (e.g. a PP homopolymer) can include from 0 wt. % to about 5% (e.g., 0, 1, 2, 3, 4, 5 wt. % and any value or range in between) of another alpha-olefin. Non-limiting examples of alpha-olefins include $C_2$-$C_8$ alpha-olefins such as ethylene, 1-butene, and 1-hexene. Homopolymers can be prepared or obtained through commercial sources such as TOTAL Petrochemicals, France and/or Total Petrochemicals USA, Inc. Non-limiting examples of homopolymers and copolymers include TOTAL Lumicene® brands.

b. Single-Site Catalyst

Single-site catalysts are catalysts that are distinct chemical species rather than mixtures of different species. Single-site catalysts can be unsupported or supported. Unsupported single-site catalysts are soluble in hydrocarbon solvents. Single-site catalysts can provide polyolefins with narrow molecular weight distributions (Mw/Mn<3) and good, uniform comonomer incorporation. Single-site catalysts include late transition metal complexes and metallocenes. Late transition metals include Columns 8 to 12 of the Periodic Table. Non-limiting examples of late transition metals include iron (Fe), cobalt (Co), nickel (Ni), copper (Cu), zinc (Zn), Ruthenium (Ru), Rhodium (Rh), palladium (Pd), silver (Ag), cadmium (Cd), osmium (Os), Iridium (Ir), platinum (Pt) and gold (Au). For example, late transition metal catalysts can include nickel (II) and palladium (II) with nitrogen ligands.

Metallocenes can be characterized generally as coordination compounds incorporating one or more cyclopentadienyl (Cp) groups (which can be substituted or unsubstituted and can be the same or different) coordinated with a transition metal through n bonding. The Cp groups can also include substitution by linear, branched or cyclic hydrocarbyl radicals and desirably cyclic hydrocarbyl radicals so as to form other contiguous ring structures, including, for example indenyl, azulenyl and fluorenyl groups. These additional ring structures can also be substituted or unsubstituted by hydrocarbyl radicals and desirably C1 to C20 hydrocarbyl radicals. Metallocene compounds can be combined with an activator and/or cocatalyst (as described in greater detail below) or the reaction product of an activator and/or cocatalyst, such as for example methylaluminoxane (MAO) and optionally an alkylation/scavenging agent such as trialkyl-aluminum compound (TEAL, TMA and/or TIBAL). Various types of metallocenes are known in the art, which can be supported. Typical support can be any support such as talc, an inorganic oxide, clay, and clay minerals, ion-exchanged layered compounds, diatomaceous earth, silicates, zeolites or a resinous support material such as a polyolefin. Specific inorganic oxides include silica and alumina, used alone, or in combination with other inorganic oxides such as magnesia, titania, zirconia and the like. Non-metallocene transition metal compounds, such as titanium tetrachloride, are also incorporated into the supported catalyst component. The inorganic oxides used as support are characterized as having an average particle size ranging from 30 600 microns, desirably from 30 100 microns, a surface area of 50 1,000 square meters per gram, desirably from 100 400 square meters per gram, a pore volume of 0.5 3.5 cc/g, desirably from about 0.5 2 cc/g.

Any metallocene can be used in the practice of the invention. As used herein unless otherwise indicated, "metallocene" includes a single metallocene composition or two or more metallocene compositions. Metallocenes are typically bulky ligand transition metal compounds generally represented by the formula: $[L]_m M[A]_n$ where L is a bulky ligand, A is a leaving group, M is a transition metal and m and n are such that the total ligand valency corresponds to the transition metal valency. The ligands L and A can be bridged to each other, and if two ligands L and/or A are present, they can be bridged. The metallocene compound can be full-sandwich compounds having two or more ligands L which can be cyclopentadienyl ligands or cyclopentadiene derived ligands or half-sandwich compounds having one ligand L, which is a cyclopentadienyl ligand or cyclopentadienyl derived ligand. The transition metal atom can be a Column 4, 5, or 6 transition metal and/or a metal from the lanthanide and actinide series of the Periodic Table. Non-limiting examples of metals include zirconium, titanium, and hafnium. Other ligands can be bonded to the transition metal, such as a leaving group. Non-limiting examples of ligands include hydrocarbyl, hydrogen or any other univalent anionic ligand. A bridged metallocene, for example, can be described by the general formula: RCpCp-'MeQx. Me denotes a transition metal element and Cp and Cp' each denote a cyclopentadienyl group, each being the same or different and which can be either substituted or unsubstituted, Q is an alkyl or other hydrocarbyl or a halogen group, x is a number and can be within the range of 1 to 3 and R is a structural bridge extending between the cyclopentadienyl rings. Metallocene catalysts and metallocene catalysts systems that produce isotactic polyolefins are disclosed in U.S. Pat. Nos. 4,794,096 and 4,975,403 which are incorporated by reference herein. These patents disclose chiral, stereorigid metallocene catalysts that polymerize olefins to form isotactic polymers and are especially useful in the polymerization of highly isotactic polypropylene.

Suitable metallocene catalysts are disclosed in, for example, U.S. Pat. Nos. 4,530,914; 4,542,199; 4,808,561; 4,871,705; 4,933,403; 4,937,299; 5,017,714; 5,026,798; 5,057,475; 5,120,867; 5,132,381; 5,155,180; 5,198,401; 5,278,119; 5,304,614; 5,324,800; 5,350,723; 5,391,790; 5,436,305; 5,510,502; 5,145,819; 5,243,001; 5,239,022; 5,329,033; 5,296,434; 5,276,208; 5,672,668; 5,304,614, 5,374,752; 5,510,502; 4,931,417; 5,532,396; 5,543,373; 6,100,214; 6,228,795; 6,124,230; 6,114,479; 6,117,955; 6,087,291; 6,140,432; 6,245,706; 6,194,341, 6,399,723, 6,380,334, 6,380,331, 6,380,330, 6,380,124, 6,380,123, 6,380,122, 6,380,121, 6,380,120, 6,376,627, 6,376,413, 6,376,412, 6,376,411, 6,376,410, 6,376,409, 6,376,408, 6,376,407, 5,635,437, 5,554,704, 6,218,558, 6,252,097, 6,255,515 and EP Publication Nos. 549 900; 576 970; and 611 773; and WO 97/32906; 98/22486; and 00/12565.

Metallocenes can be used in combination with some form of activator in order to create an active catalyst system. The term "activator" is defined herein to be any compound or component, or combination of compounds or components, capable of enhancing the ability of one or more metallocenes to polymerize olefins to polyolefins. Alklyalumoxanes such as methylalumoxane (MAO) are commonly used as metallocene activators. Generally alkylalumoxanes contain about 5 to 40 of the repeating units. Alumoxane solutions, particularly methylalumoxane solutions, can be obtained from commercial vendors as solutions having various concentrations. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,103,031 and EP-A-0 561 476, EP 0 279 586, EP-A-0 594 218 and WO 94/10180, each fully incorporated herein by reference.

Ionizing activators can also be used to activate metallocenes. These activators are neutral or ionic, or are compounds such as tri (n-butyl) ammonium tetrakis(pentafluorophenyl) borate, which ionize the neutral metallocene compound. Such ionizing compounds can contain an active proton, or some other cation associated with, but not coordinated or only loosely coordinated to, the remaining ion of the ionizing compound. Combinations of activators can also be used, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 each fully incorporated herein by reference. These teach a desirable method of preparation wherein metallocenes (bisCp and monoCp) are protonated by an anion precursor such that an alkyl/hydride group is abstracted from a transition metal to make it both cationic and charge-balanced by the non-coordinating anion. Suitable ionic salts include tetrakis-substituted borate or aluminum salts having fluorided aryl-constituents such as phenyl, biphenyl and naphthyl.

The term "noncoordinating anion" ("NCA") means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion.

The use of ionizing ionic compounds not containing an active proton but capable of producing both the active metallocene cation and a noncoordinating anion is also known. See, for example, EP-A-0 426 637 and EP-A-0 573 403 each fully incorporated herein by reference. An additional method of making the ionic catalysts uses ionizing anion precursors which are initially neutral Lewis acids but form the cation and anion upon ionizing reaction with the metallocene compounds, for example the use of tris(pentafluorophenyl) borane, see EP-A-0 520 732, which is fully incorporated herein by reference. Ionic catalysts for addition polymerization can also be prepared by oxidation of the metal centers of transition metal compounds by anion precursors containing metallic oxidizing groups along with the anion groups, see EP-A-0 495 375, which is fully incorporated herein by reference.

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 for in situ processes describing the reaction of alkyl aluminum compounds with dihalo-substituted metallocene compounds prior to or with the addition of activating anionic compounds.

Desirable methods for supporting ionic catalysts comprising metallocene cations and NCA are described in U.S. Pat. Nos. 5,643,847; 6,228,795; and 6,143,686, each fully incorporated herein by reference. When using the support composition, these NCA support methods can include using neutral anion precursors that are sufficiently strong Lewis acids to react with the hydroxyl reactive functionalities present on the silica surface such that the Lewis acid becomes covalently bound. Additionally, when the activator for the metallocene supported catalyst composition is a NCA, desirably the NCA is first added to the support composition followed by the addition of the metallocene catalyst. When the activator is MAO, desirably the MAO and metallocene catalyst are dissolved together in solution. The support is then contacted with the MAO/metallocene catalyst solution. Other methods and order of addition will be apparent to those skilled in the art.

c. Single-Site Polyolefin Production

The single-site polyolefin can be formed by placing one or more olefin monomer (e.g., ethylene, propylene) alone or with other monomers in a suitable reaction vessel in the presence of a single-site catalyst and under suitable reaction conditions for polymerization thereof. Any suitable equipment and processes for polymerizing the olefin into a polymer can be used. For example, such processes can include solution phase, gas phase, slurry phase, bulk phase, high pressure processes or combinations thereof. Such processes are described in detail in U.S. Pat. Nos. 5,525,678; 6,420,580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735; and 6,147,173, each fully incorporated herein by reference.

Single-site polyolefins can be formed by a gas phase polymerization process. One example of a gas phase polymerization process includes a continuous cycle system, where a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers can be continuously cycled through a fluidized bed in the presence of a catalyst under reactive conditions. The cycling gas stream is generally withdrawn from the fluidized bed and recycled back into the reactor. Simultaneously, single-site polyolefin polymer can be withdrawn from the reactor and fresh monomer can be added to replace the polymerized monomer. The reactor pressure in a gas phase process can vary from 100 psig to 500 psig, or from 200 psig to 400 psig, or from 250 psig to 350 psig. The reactor temperature in a gas phase process can be from 30° C. to 120° C. or from 60° C. to 115° C. or from 70° C. to 110° C. or from 70° C. to 95° C. Non-limiting examples of polymer processes are described in U.S. Pat. Nos. 4,543, 399; 4,588,790; 5,028,670; 5,317,036; 5,352,749; 5,405, 922; 5,436,304; 5,462,999; 5,616,661; 5,627,242; 5,665, 818; 5,677,375; and 5,668,228, which are incorporated herein by reference in their entirety.

D. Articles of Manufacture

The polymer sheet of the present invention can be stored for a time, used as is, or employed immediately in a forming process. The forming process can include thermoforming or molding. The molded articles can included beverage ring such as six-pack ring holders, lids such as overcap lids and the like.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Extruded Sheets from Single-Site Catalyzed Polyolefin, Comparative LDPE and Comparative Injection Molded (IM) Lid Five different materials were examined for potential use in various sheet applications. The first material was an LDPE reference (LDPE #1, which was Westlake EF403 (fractional melt low-density formulation with melt index of 0.8 g/10 min and density of 0.924 g/cm³) produced by Westlake Chemical (USA)) made using a non-single site catalyst, and the other four were metallocene medium density polyethylene materials (referred to as mPE #1-#4 obtained from TOTAL, USA). The sheets were produced using a Davis Standard Sheet Line with a 1.5 inch diameter primary extruder with a vertical 3 roll stack. Each of the five materials was used to make extruded sheet at various thicknesses including 10, 15, 20, and 30 mil (or 0.010", 0.015", 0.020", and 0.030"). Tables 1 and 2 lists a summary of properties of the LDPE sheet made with a non-single site catalyst, polymer sheets of various thickness made with a single-site catalyst, and a commercially available injection molded lid made from LLDPE. The lid was 4.6 inches (11.68 cm) in diameter, 9.6 g in weight, and 23.7 mils (0.061 cm) thick.

Sheet shrinkage decreased with increasing sheet thickness (FIG. 1). The LDPE exhibited similar shrinkage performance to the mPE #1 and mPE #2 sheets, which have the most similar densities. mPE #3 exhibited much less shrinkage than LDPE and mPE #4 exhibited very different behavior (shrinking similarly in both the M and T directions) than the other samples. The injection molded lid was predicted to have better shrinkage characteristics than the mPE sheets due to the paucity of higher molecular weight species. Higher molecular weight species tend to retain processing orientation when it occurs. With few high molecular weight chains, any orientation can relax out of the melt quickly, prior to the melt fully solidifying. Thus, the cast sheet might be expected to have more shrinkage due to higher molecular weight. In fact, injection molded lids showed surprisingly little advantage. Cast sheets had shrinkage characteristics that are similar the injection molded lids (see FIG. 1). Machine direction shrinkage was between that of mPE #3 and mPE #1. Transverse direction shrinkage was slightly higher than mPE #3. From this data, it is predicted that the single-site catalyzed polymer sheets can be successfully used in any melt phase thermoforming parts, melt billet phase forming, as well as very shallow draw thermoforming (such as drape forming), like one would find in lidstock.

Figure 2:
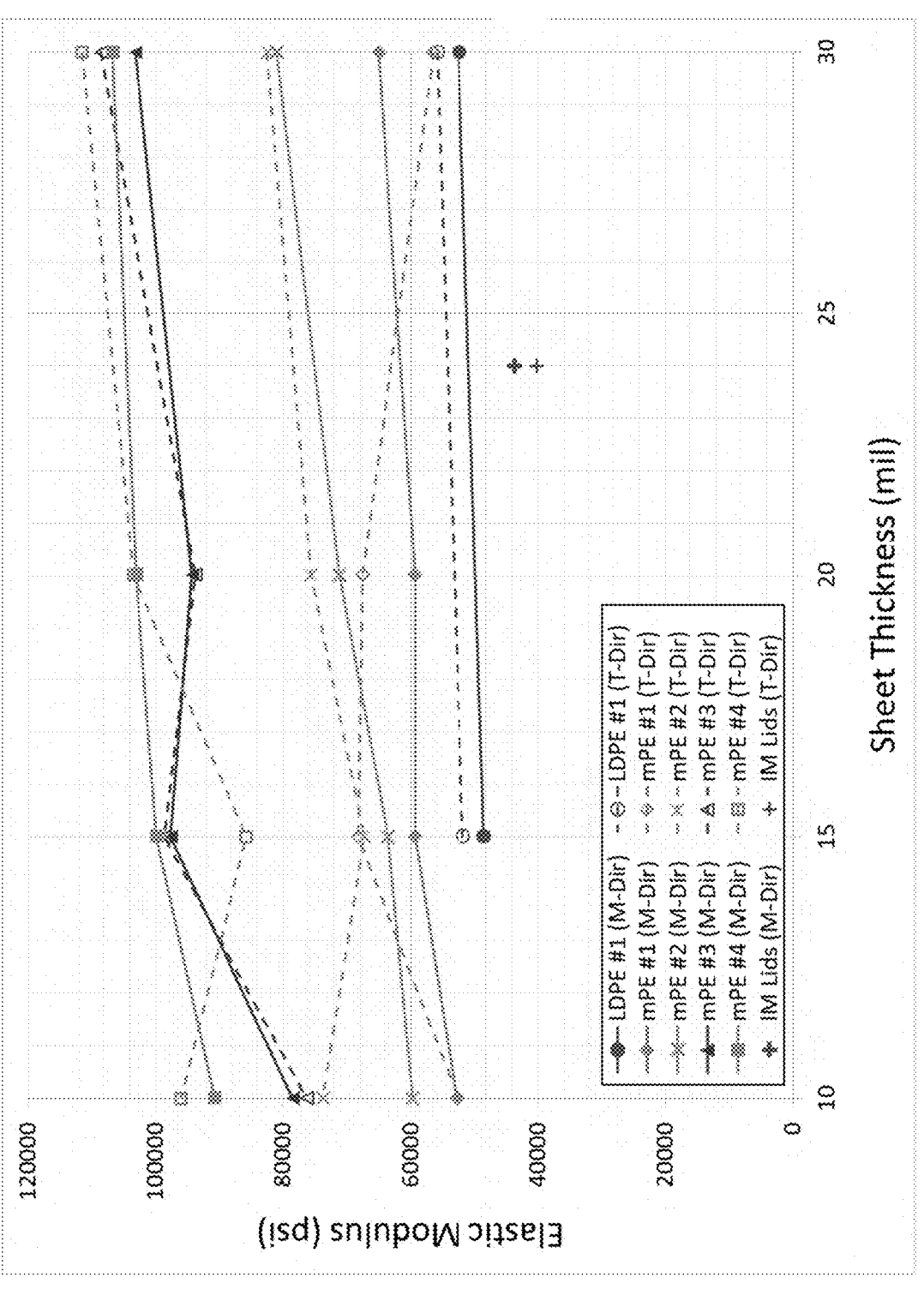
FIG. 2 shows stiffness data for the comparative LDPE sheet, the polymer sheets of the present invention, and an IM lid.
Figure 3:
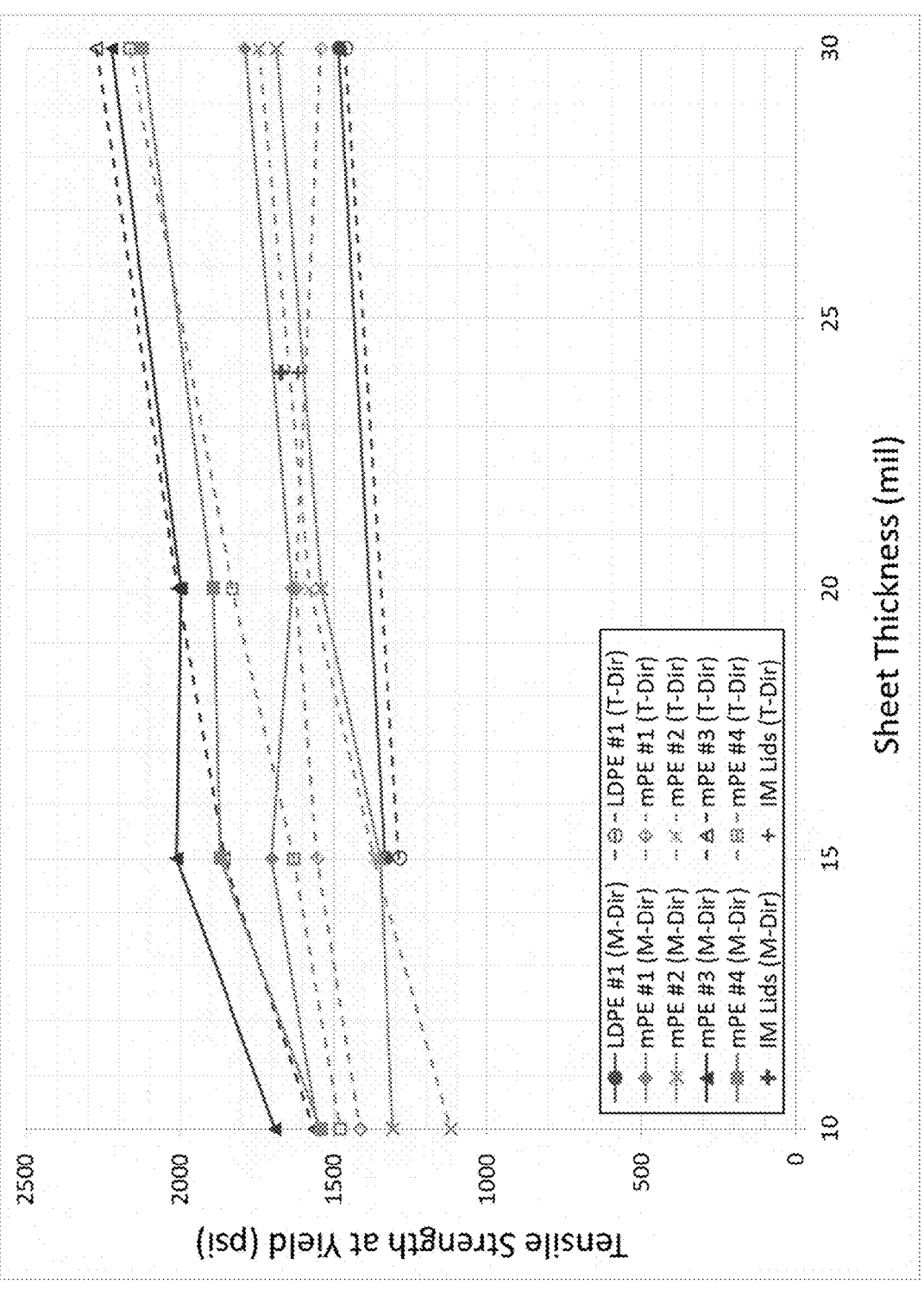
FIG. 3 shows tensile at yield for the comparative LDPE sheet, the polymer sheets of the present invention, and an IM lid.
Figure 4:
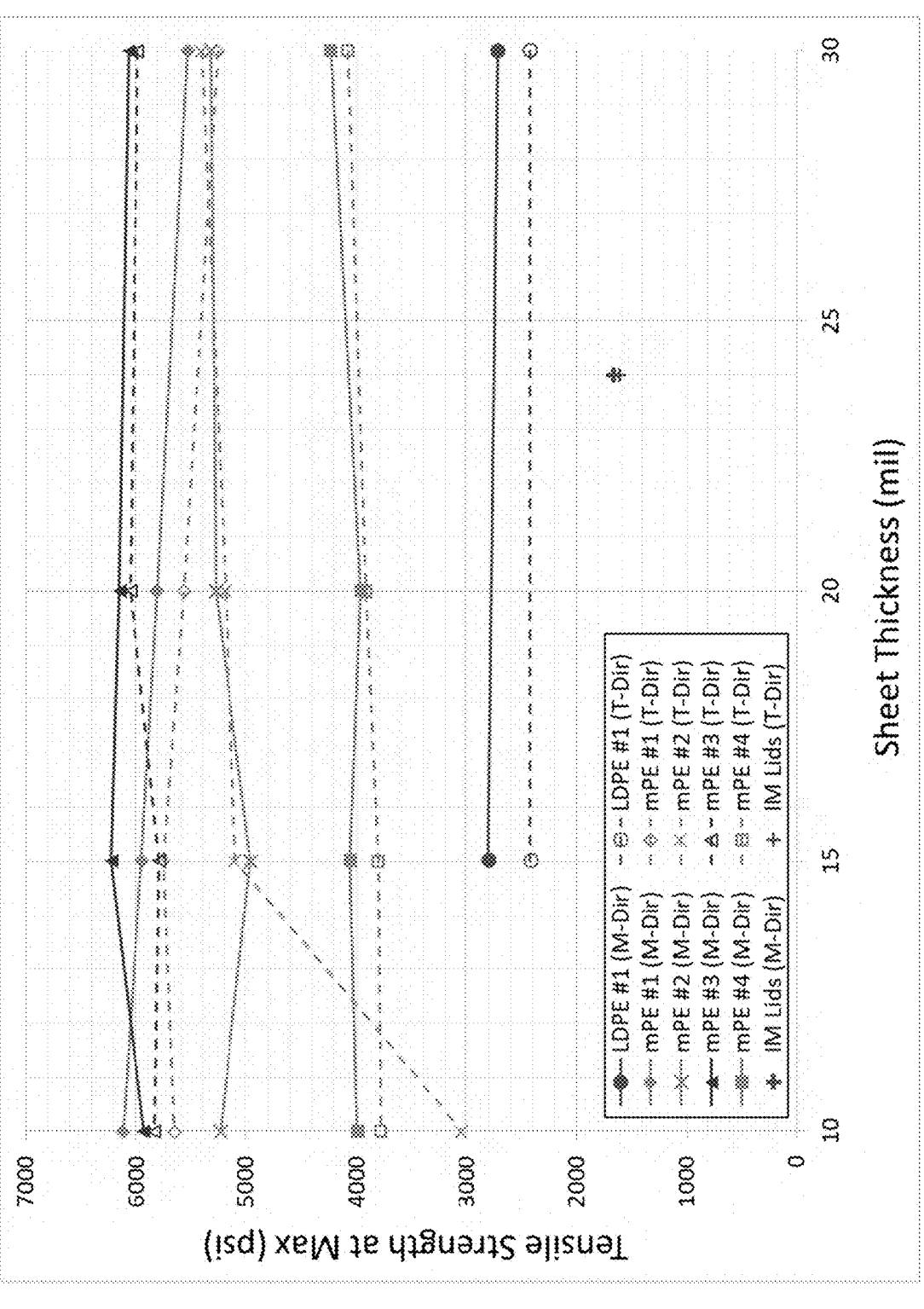
FIG. 4 shows tensile at maximum for the comparative LDPE sheet, the polymer sheets of the present invention, and an IM lid.

The mPE sheets exhibited superior tensile performance in stiffness (FIG. 2), strength (FIG. 3), and toughness (FIG. 4) compared to the LDPE sheets. In general the sheet thickness showed little sensitivity to normalized tensile properties, indicating these tensile properties can almost be treated directly as material properties (rather than application sensitive). From the data, it was determined that was softer IM lid, which was expected as the IM lid had a lower density. Thus, the single-site polymer sheets of the present invention can be used for lightweight as the sheets made from the single-site polymers can be downgauged while matching or exceeding current market expectations on lidding.

Yield strength has some correlation to stiffness and is an important attribute for identifying when forces will permanently deform an article. For lidding, yield stress can be important in high speed filling operations as well as with customers (a lid might be permanently deformed if it is difficult to pull off, for example). The injection molded lid performed similarly to mPE #1 and mPE #2 and yielded more readily than mPE #3 or mPE #4 (See, FIG. 3). A lid made from either mPE #3 or mPE #4 could be lightweighted to 15 mils (0.0381 cm) or less and still match or exceed the injection molded lid yield strength.

In addition to the point that a tensile specimen may yield, the maximum stress achieved can be critical in some applications as it includes hardening phenomenon that is achieved before tensile failure. In this case, the single-site catalyzed polymers of the present invention all showed vastly superior maximum strengths (See, FIG. 4) indicating further lightweighting can be achievable for applications that design around maximum strength instead of yield strength.

Figure 5:
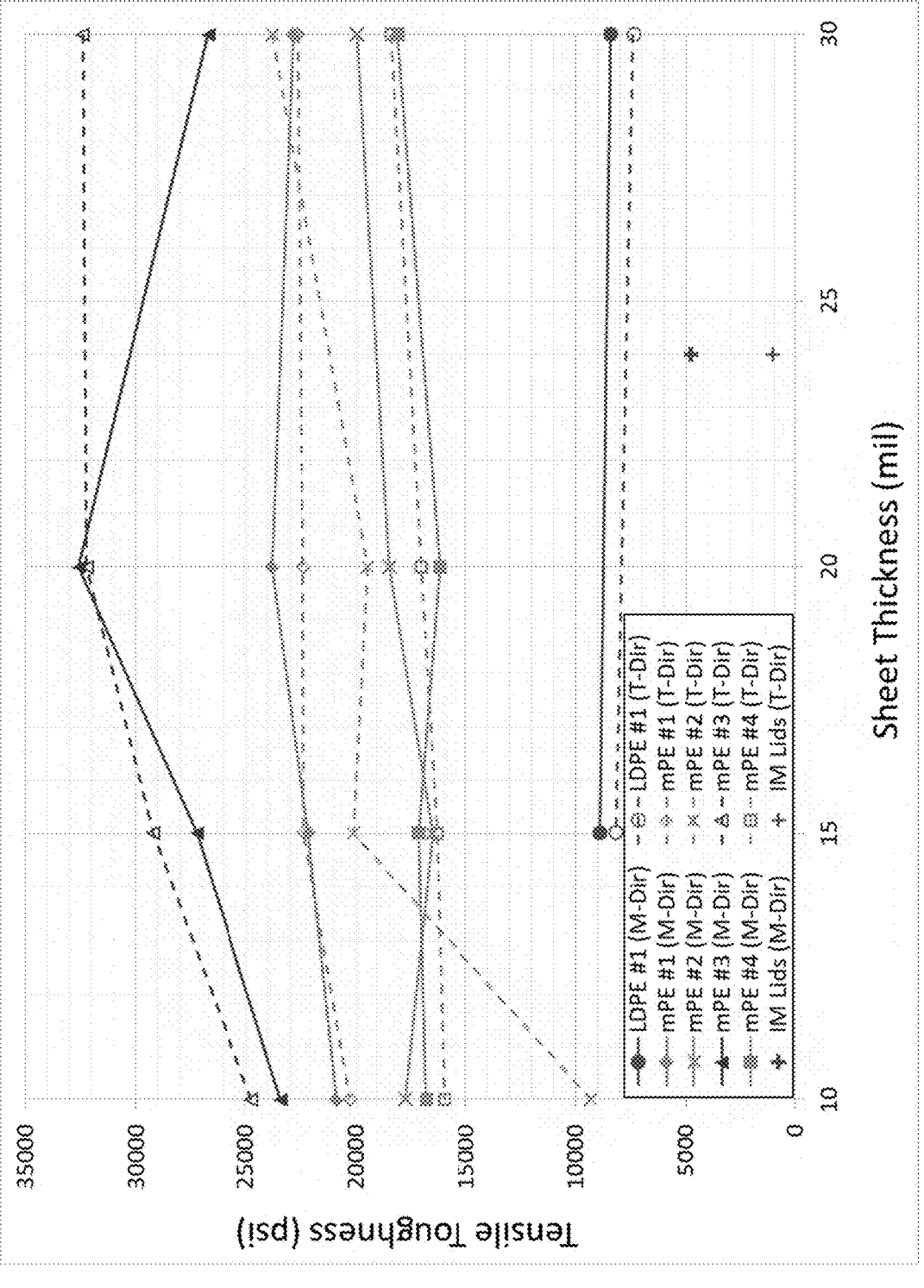
FIG. 5 shows tensile toughness for the comparative LDPE sheet, the polymer sheets of the present invention, and an IM lid.
Figure 6:
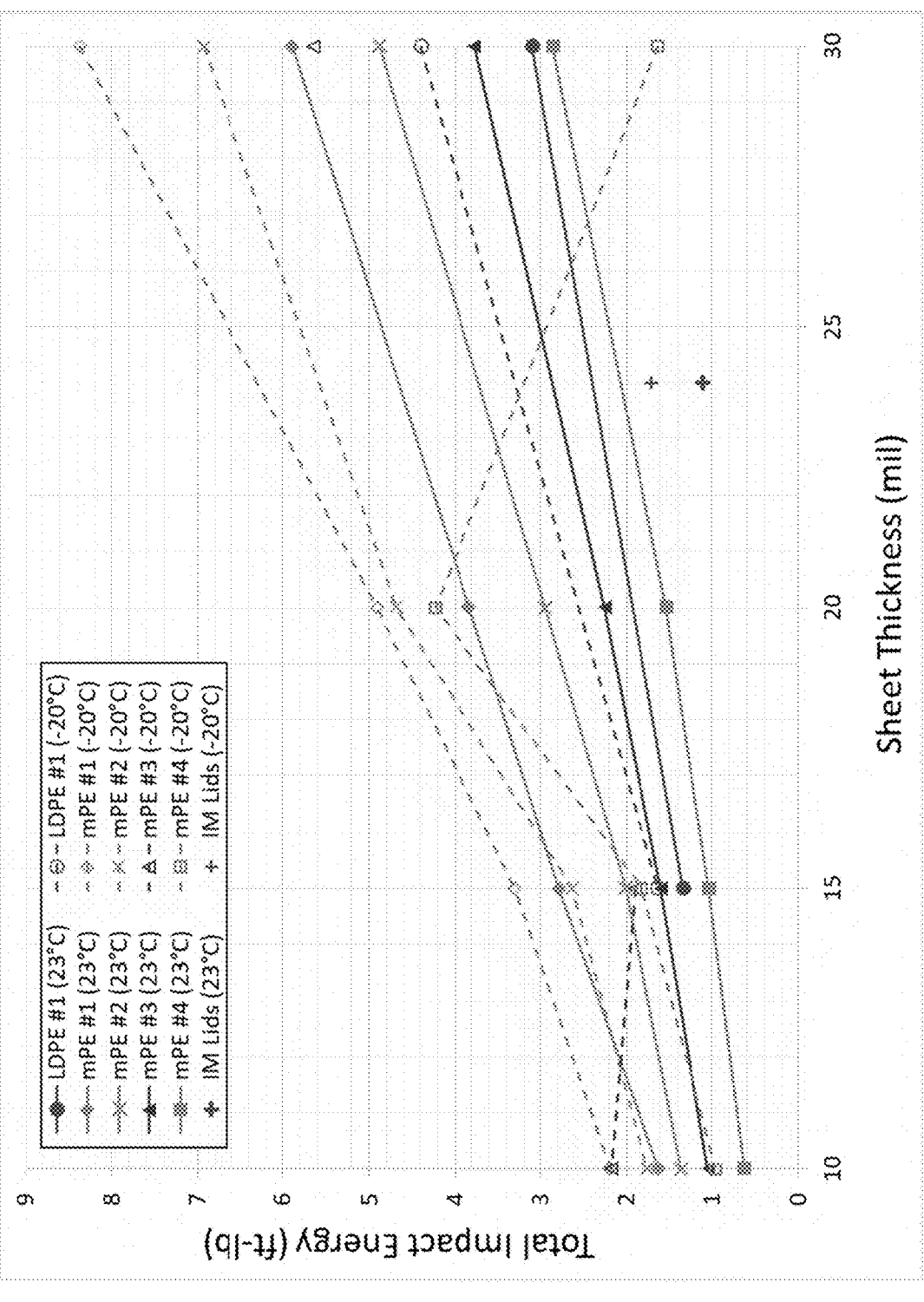
FIG. 6 shows total impact energy for the comparative LDPE sheet, the polymer sheets of the present invention, and an IM lid.
Figure 7:
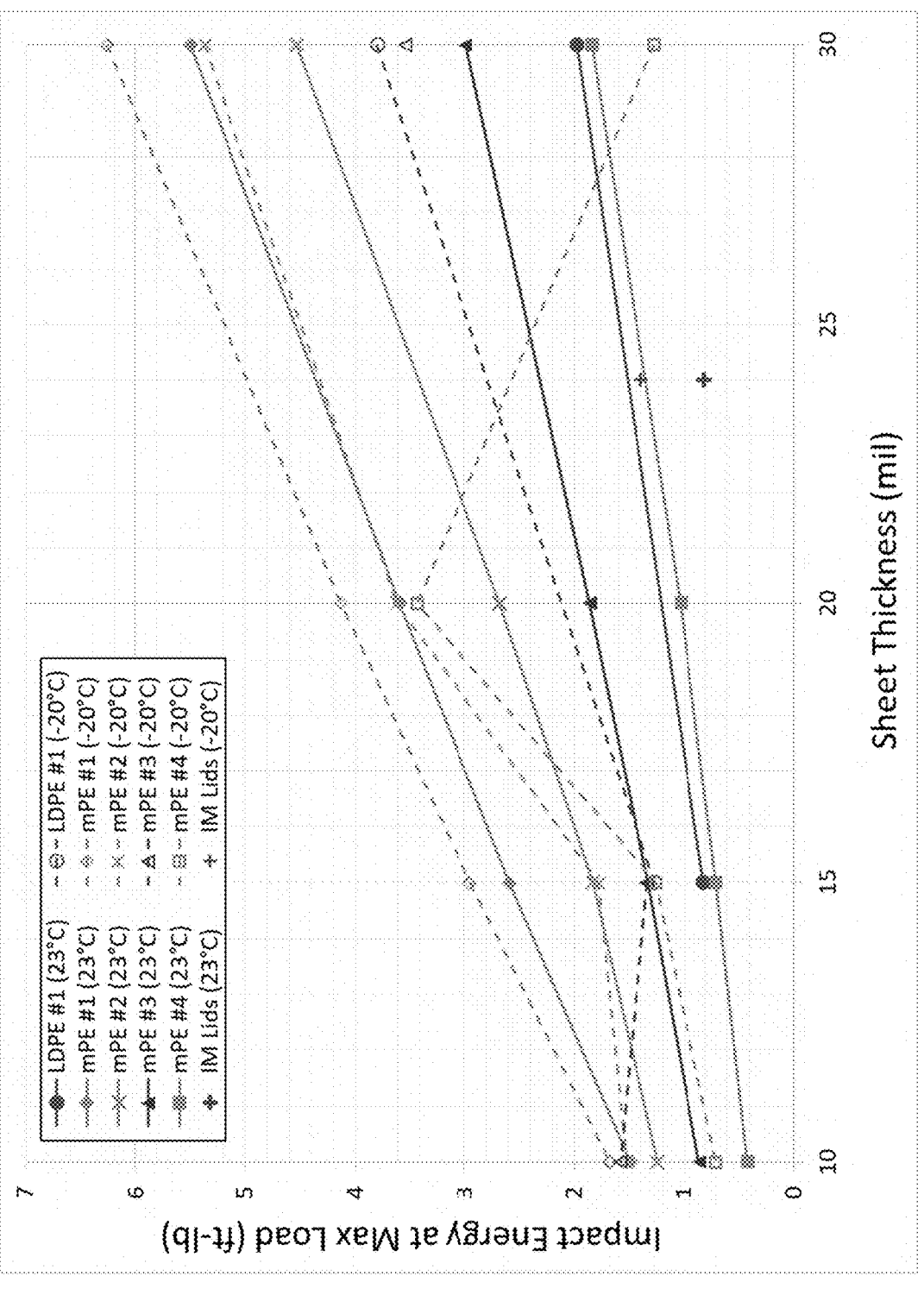
FIG. 7 shows total impact energy at maximum load for the comparative LDPE sheet, the polymer sheets of the present invention, and an IM lid.
Figure 8:
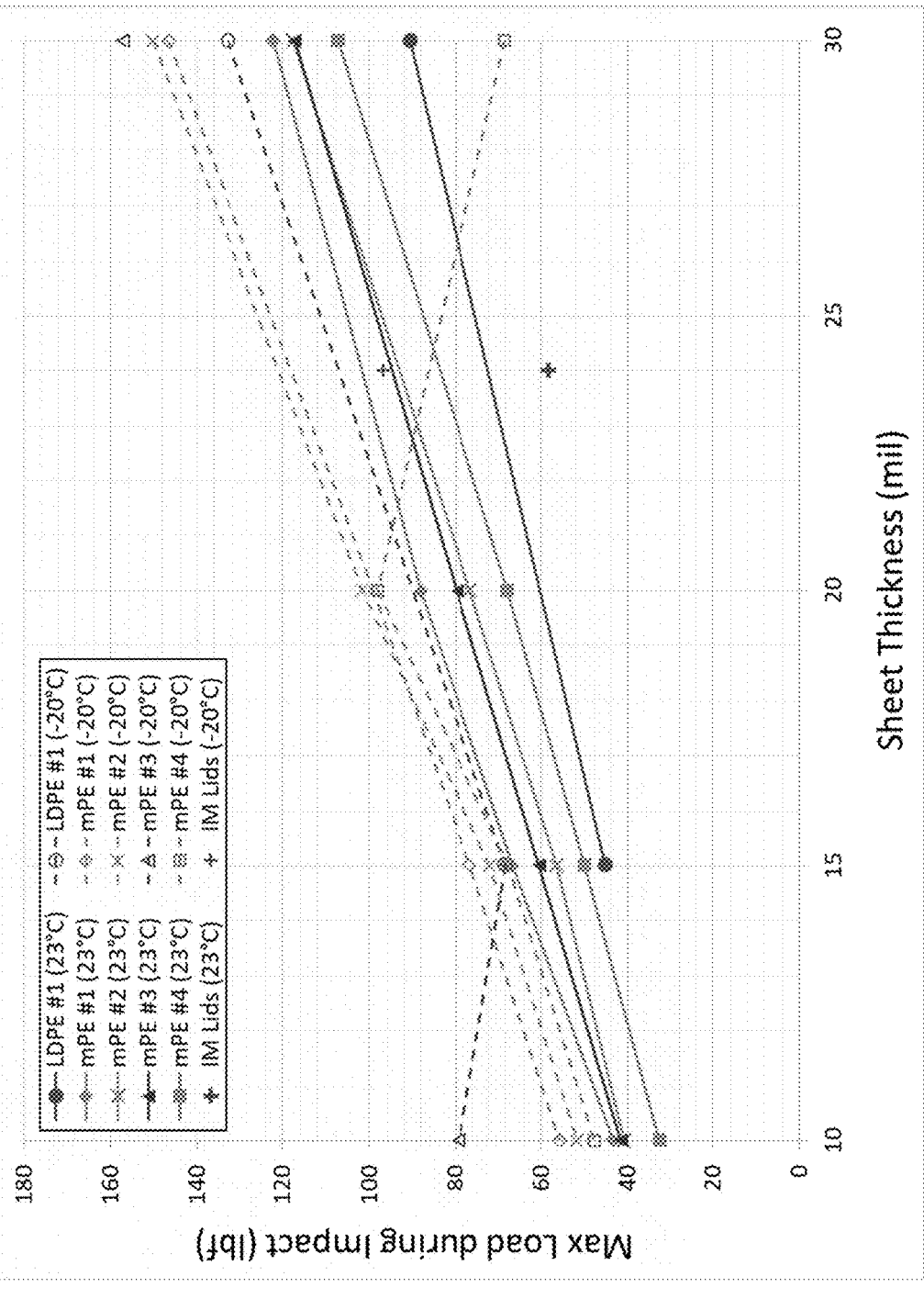
FIG. 8 shows maximum load during impact for the comparative LDPE sheet, the polymer sheets of the present invention, and an IM lid.

The tensile data was also used to illustrate the ability of each sheet to absorb energy under relatively slow loading (as opposed to impact testing discussed later). The total energy was calculated by integrating the stress-strain data and multiplying by the initial volume of the tested area. The data for the machine direction, is presented in the FIG. 5. It should be noted that the Transverse data was very similar. As one would expect, thicker sheet was able to absorb more tensile energy. For the most part, this data followed the trends indicated by the stiffness and strength. The main exceptions was in the mPE #4 and the IM Lids. In the mPE #4 case, the maximum strength was significantly lower (indicating less orientation driven hardening) that contributed to the relatively low tensile energy. The IM Lids exhibited drastically lower elongation at break, significantly reducing the calculated tensile energy. Overall this information provided an indication of how much energy it may take to slowly rip or puncture the sheet.

Impact drop testing is a particularly important feature in packaging. Inventory loss, such as through damaged packaging, is called shrinkage in the retail industry. Broken food containers are a concern at a customer level, since damage can be ingress points for pathogens, cause product leaking and otherwise be a source of frustration. The impact performance for most of the mPE sheets (except mPE #4, which has a higher MFI), exhibited superior impact performance at both room temperature and −20° C. (see FIG. 5). This performance boost was proportional to sheet thickness after applying a shift factor of +0.42 ft-lb for room temperature results and 1.10 ft-lb for the −20° C. results. From the data, it was determined that sheet thickness for mPE #2 was reduced by 38% without any loss in tensile or impact performance and the properties can be higher in some instances. Both the room temperature and −20° C. impact tests on the IM lid demonstrated the single-site catalyzed polymer sheet options were superior. Sample mPE #1, mPE #2 and mPE #3 all showed better impact performance 10 mils (0.0245 cm), only 42% as thick as the IM lid. Even mPE #4, with a 5.7 MI2 and 0.933 g/cc density, gave the same impact performance at only 15 mils (0.0381 cm). Thus, using single-site catalyzed polymer sheets can allow substantial lightweighting without sacrificing drop impact performance.

TABLE 1

| Name | | LDPE #1 compar. | mPE #1 Pres. Inv. | mPE #2 Pres. Inv. | mPE #3 Pres. Inv. | mPE #4 Pres. Inv. | LIDS |
|---|---|---|---|---|---|---|---|
| Density by Displacement | | | | | | | |
| Density | g/cc | 0.9238 | 0.9265 | 0.9297 | 0.933 | 0.9331 | 0.9224 |
| DSC | | | | | | | |
| Melt Peak | ° C. | 114.6 | 119.3 | 121.3 | 124.6 | 122.1 | 121.5 |
| Melt DH | J/g | 94.9 | 126.9 | 122.8 | 156.3 | 149 | 125.4 |
| Recrystallization Peak | ° C. | 98.4 | 106.4 | 105.3 | 111.5 | 108.2 | 106.8 |
| Recrystallization DH | J/g | 66.1 | 114.4 | 114.6 | 148.7 | 138.1 | 100.5 |
| Melt Flow Index | | | | | | | |
| MFI 190/2.16 | dg/min | 0.78 | 0.41 | 0.8 | 0.81 | 5.71 | 104.97 |
| MFI 190/21.6 | dg/min | 40.8 | 13.5 | 23.3 | 24.5 | 125 | 839 |
| GPC | | | | | | | |
| Mn | Daltons | 20962 | 38340 | 33019 | 30870 | 21657 | 9255 |
| Mw | Daltons | 77210 | 98930 | 87169 | 84995 | 57421 | 30577 |
| Mz | Daltons | 202322 | 198825 | 175370 | 168717 | 112590 | 102890 |
| Peak MW | Daltons | 67437 | 69208 | 64866 | 65711 | 45732 | 19979 |
| Polydispersity | (—/—) | 3.7 | 2.6 | 2.6 | 2.8 | 2.7 | 3.3 |
| Rheology (CY Fit) | | | | | | | |
| Ref. Temperature | ° C. | 190 | 190 | 190 | 190 | 190 | 190 |
| Zero Shear Viscosity | Pa-s | 26695 | 1028771 | 94938 | 85383 | 1790 | 70.2 |
| Flow Activation Energy | kJ/mol | 49.05 | 27.86 | 29.56 | 27.32 | 30.99 | 30.27 |
| Relaxation Time | s | 6.86E−02 | 9.00E−04 | 5.00E−04 | 8.00E−04 | 9.00E−04 | 6.42E−04 |
| Breadth Parameter | (—/—) | 0.295 | 0.1027 | 0.1363 | 0.141 | 0.3523 | 0.8039 |
| Exponent | (—/—) | 0 | 0 | 0 | 0 | 0 | 0 |
| DMA Torsion | | | | | | | |
| Storage Modulus at 30° C. | psi | 18247 | 26902 | 29125 | 39929 | 39405 | 23193 |
| Storage Modulus at 60° C. | psi | 9876 | 15260 | 16377 | 23415 | 22587 | 7678 |
| Storage Modulus at 90° C. | psi | 4492 | 7919 | 8685 | 12862 | 11784 | 3341 |
| Loss Modulus at 30° C. | psi | 3413 | 4848 | 5131 | 6442 | 6590 | 3776 |
| Loss Modulus at 60° C. | psi | 2101 | 3259 | 3560 | 5196 | 5020 | 1133 |
| Loss Modulus at 90° C. | psi | 1099 | 1749 | 1972 | 3101 | 2809 | 182 |
| HDT estimate at 0.05% | ° F. | 102.9 | 112.0 | 115.1 | 125.6 | 122.7 | 88.0 |
| HDT estimate at 0.20% | ° F. | 133.1 | 147.8 | 150.9 | 167.0 | 161.4 | 105.7 |
| Wax Extraction | | | | | | | |
| Wax Content | % | 55.9 | 16.1 | 9.2 | 1.4 | 20.4 | 73.8 |
| Polymer Ash | | | | | | | |
| Ash Content | % | 0.2738 | 0.0198 | 0.0249 | 0.0207 | 0.0403 | 0.0075 |

TABLE 2

| Name | | LDPE #1 Comparative | | mPE #1 Present invention | | | | mPE #2 Present invention | |
|---|---|---|---|---|---|---|---|---|---|
| Resin Characteristics | | | | | | | | | |
| Density | g/cc | 0.9238 | | 0.9265 | | | | 0.9297 | |
| MFI 190/2.16 | dg/min | 0.78 | | 0.41 | | | | 0.8 | |
| SHEET | | | | | | | | | |
| Sheet Thickness | mil | 30 | 15 | 30 | 20 | 15 | 10 | 30 | 20 |
| GLOSS | | | | | | | | | |
| Gloss 45 (inside) | | 50.1 | 53.1 | 42.9 | 56.5 | 59.8 | 63.2 | 48.8 | 47 |
| SHRINKAGE (140° C. for 30 min) | | | | | | | | | |
| % Shrinkage-MD | % | 17.94 | 40.29 | 16.76 | 30.00 | 37.35 | 55.88 | 20.59 | 31.47 |
| % Shrinkage-TD | % | −0.88 | −4.71 | −0.59 | −2.65 | −4.41 | −7.65 | −0.59 | −2.65 |
| PE_TENSILE (M-Direction) | | | | | | | | | |
| Tensile Modulus | psi | 52409 | 48484 | 65007 | 59266 | 59260 | 52690 | 81062 | 71179 |
| Elongation at Yield | % | 42.8 | 46.8 | 38.1 | 39.3 | 41 | 41.9 | 10.1 | 36 |
| Tensile Strength at Yield | psi | 1485 | 1334 | 1786 | 1635 | 1702 | 1552 | 1684 | 1540 |
| Tensile Strength @Max | psi | 2712 | 2798 | 5534 | 5810 | 5951 | 6117 | 5320 | 5274 |
| Elongation at Break | % | 477.6 | 508.7 | 684.9 | 710.5 | 686.2 | 674.5 | 710.7 | 710.4 |
| Tensile Strength at Break | psi | 2708 | 2795 | 5532 | 5808 | 5947 | 6113 | 5318 | 5272 |
| Tensile Energy | ft-lb | 13.37 | 7.36 | 36.14 | 25.96 | 17.98 | 11.34 | 31.72 | 19.79 |
| Tensile Toughness | psi | 8443 | 8918 | 22820 | 23793 | 22152 | 20881 | 19961 | 18492 |
| PE_TENSILE (T-Direction) | | | | | | | | | |
| Tensile Modulus | psi | 55847 | 51795 | 56342 | 67525 | 68230 | 52503 | 82482 | 75635 |
| Elongation at Yield | % | 11.2 | 11.4 | 9.4 | 10.5 | 10.5 | 41.9 | 9.4 | 9.4 |
| Tensile Strength at Yield | psi | 1464 | 1289 | 1542 | 1624 | 1554 | 1415 | 1742 | 1579 |
| Tensile Strength @Max | psi | 2423 | 2420 | 5263 | 5565 | 5755 | 5653 | 5406 | 5190 |
| Elongation at Break | % | 478.6 | 515.9 | 753.5 | 759.9 | 756.7 | 724.4 | 794.6 | 730.7 |
| Tensile Strength at Break | psi | 2420 | 2417 | 5256 | 5561 | 5751 | 5645 | 5405 | 5187 |
| Tensile Energy | ft-lb | 11.78 | 6.56 | 37.74 | 24.75 | 18.26 | 10.73 | 37.97 | 20.98 |
| Tensile Toughness | psi | 7402 | 8193 | 22623 | 22410 | 22355 | 20261 | 23775 | 19465 |
| INSTRUM_IMPACT (Room Temp) | | | | | | | | | |
| Total Energy | ft-lb | 3.1 | 1.34 | 5.89 | 3.83 | 2.79 | 1.63 | 4.88 | 2.95 |
| Energy to Max Load | ft-lb | 1.98 | 0.82 | 5.5 | 3.59 | 2.59 | 1.49 | 4.53 | 2.68 |
| Energy After Max Load | ft-lb | 1.12 | 0.52 | 0.39 | 0.24 | 0.2 | 0.14 | 0.35 | 0.27 |
| Maximum Load | lbf | 90.54 | 45.21 | 122.2 | 87.96 | 66.68 | 43.33 | 117.52 | 76.63 |
| INSTRUM_IMPACT (Room Temp set 2) | | | | | | | | | |
| Total Energy | ft-lb | 3.22 | 1.35 | 5.83 | 3.72 | 2.73 | 1.67 | 4.72 | 2.96 |
| Energy to Max Load | ft-lb | 2.06 | 0.95 | 5.44 | 3.5 | 2.53 | 1.55 | 4.41 | 2.74 |
| Energy After Max Load | ft-lb | 1.16 | 0.4 | 0.39 | 0.22 | 0.2 | 0.12 | 0.31 | 0.22 |
| Maximum Load | lbf | 89.62 | 43.88 | 117.01 | 81.25 | 64.84 | 43.73 | 113.35 | 77.34 |
| INSTRUM_IMPACT (−20° C.) | | | | | | | | | |
| Total Energy | ft-lb | 4.4 | 1.64 | 8.37 | 4.91 | 3.3 | 2.19 | 6.93 | 4.68 |
| Energy to Max Load | ft-lb | 3.8 | 1.27 | 6.26 | 4.13 | 2.95 | 1.68 | 5.37 | 3.62 |
| Energy After Max Load | ft-lb | 0.6 | 0.37 | 2.11 | 0.78 | 0.35 | 0.51 | 1.56 | 1.06 |
| Maximum Load | lbf | 132.79 | 68.54 | 146.61 | 98.97 | 76.61 | 55.74 | 150.23 | 101.56 |

| Name | | mPE #2 Present invention | | mPE #3 Present invention | | | |
|---|---|---|---|---|---|---|---|
| Resin Characteristics | | | | | | | |
| Density | g/cc | 0.9297 | | 0.933 | | | |
| MFI 190/2.16 | dg/min | 0.8 | | 0.81 | | | |
| SHEET | | | | | | | |
| Sheet Thickness | mil | 15 | 10 | 30 | 20 | 15 | 10 |
| GLOSS | | | | | | | |
| Gloss 45 (inside) | | 52.1 | 51.7 | 49.8 | 54.7 | 52.3 | 53.4 |
| SHRINKAGE (140° C. for 30 min) | | | | | | | |
| % Shrinkage-MD | % | 43.82 | 56.76 | 14.12 | 21.76 | 28.82 | 38.82 |
| % Shrinkage-TD | % | −4.71 | −8.53 | 1.18 | 2.35 | 1.18 | 3.24 |
| PE_TENSILE (M-Direction) | | | | | | | |
| Tensile Modulus | psi | 63553 | 59625 | 103174 | 94285 | 97626 | 78492 |
| Elongation at Yield | % | 36.7 | 35.4 | 9.7 | 10.3 | 10.5 | 10.9 |
| Tensile Strength at Yield | psi | 1350 | 1308 | 2223 | 1998 | 2012 | 1692 |
| Tensile Strength @Max | psi | 4960 | 5237 | 6066 | 6154 | 6226 | 5933 |
| Elongation at Break | % | 659 | 672.7 | 849.4 | 862.5 | 853.2 | 808 |

TABLE 2-continued

| | | | | | | | |
|---|---|---|---|---|---|---|---|
| Tensile Strength at Break | psi | 4955 | 5235 | 6064 | 6154 | 6223 | 5930 |
| Tensile Energy | ft-lb | 13.20 | 9.69 | 42.20 | 35.47 | 22.11 | 12.77 |
| Tensile Toughness | psi | 16528 | 17757 | 26733 | 32587 | 27242 | 23408 |
| PE_TENSILE (T-Direction) | | | | | | | |
| Tensile Modulus | psi | 67305 | 73734 | 108551 | 93746 | 98564 | 76291 |
| Elongation at Yield | % | 9.3 | 8.6 | 9.5 | 10.1 | 9.5 | 9.9 |
| Tensile Strength at Yield | psi | 1369 | 1121 | 2272 | 2008 | 1856 | 1566 |
| Tensile Strength @Max | psi | 5100 | 3046 | 5987 | 6051 | 5792 | 5835 |
| Elongation at Break | % | 744 | 490.1 | 926 | 924 | 885.6 | 884.5 |
| Tensile Strength at Break | psi | 5100 | 3045 | 5987 | 6050 | 5790 | 5831 |
| Tensile Energy | ft-lb | 16.10 | 5.35 | 50.89 | 35.33 | 23.57 | 13.17 |
| Tensile Toughness | psi | 20100 | 9318 | 32402 | 32224 | 29222 | 24740 |
| INSTRUM_IMPACT (Room Temp) | | | | | | | |
| Total Energy | ft-lb | 2.01 | 1.37 | 3.77 | 2.26 | 1.6 | 1.05 |
| Energy to Max Load | ft-lb | 1.83 | 1.24 | 2.99 | 1.86 | 1.33 | 0.86 |
| Energy After Max Load | ft-lb | 0.18 | 0.13 | 0.78 | 0.4 | 0.27 | 0.19 |
| Maximum Load | lbf | 56.52 | 40.84 | 117.21 | 79.68 | 60.53 | 41.57 |
| INSTRUM_IMPACT (Room Temp set 2) | | | | | | | |
| Total Energy | ft-lb | 2.09 | 1.42 | 3.88 | | 1.6 | 2.28 |
| Energy to Max Load | ft-lb | 1.91 | 1.31 | 2.8 | | 1.21 | 1.93 |
| Energy After Max Load | ft-lb | 0.18 | 0.11 | 1.08 | | 0.39 | 0.35 |
| Maximum Load | lbf | 56.84 | 40.91 | 113.17 | | 55.78 | 75.36 |
| INSTRUM_IMPACT (−20° C.) | | | | | | | |
| Total Energy | ft-lb | 2.63 | 1.76 | 5.64 | | 1.9 | 2.18 |
| Energy to Max Load | ft-lb | 1.78 | 1.52 | 3.54 | | 1.34 | 1.58 |
| Energy After Max Load | ft-lb | 0.85 | 0.24 | 2.1 | | 0.56 | 0.6 |
| Maximum Load | lbf | 72.01 | 51.67 | 157.24 | | 68.25 | 79.17 |

| Name | | mPE #4 Present invention | | | | IM Lids LIDS |
|---|---|---|---|---|---|---|
| Resin Characteristics | | | | | | |
| Density | g/cc | | 0.9331 | | | 0.9224 |
| MFI 190/2.16 | dg/min | | 5.71 | | | 104.97 |
| SHEET | | | | | | |
| Sheet Thickness | mil | 30 | 20 | 15 | 10 | 24 |
| GLOSS | | | | | | |
| Gloss 45 (inside) | | 48.9 | 45.1 | 18.1 | 40.3 | N/A |
| SHRINKAGE (140° C. for 30 min) | | | | | | |
| % Shrinkage-MD | % | 11.47 | 17.94 | 21.18 | 27.06 | 24.00 |
| % Shrinkage-TD | % | 7.06 | 14.12 | 17.35 | 25.88 | 4.00 |
| PE_TENSILE (M-Direction) | | | | | | |
| Tensile Modulus | psi | 106788 | 103015 | 99794 | 90757 | 43597 |
| Elongation at Yield | % | 10.3 | 10 | 9.8 | 10.7 | 16 |
| Tensile Strength at Yield | psi | 2122 | 1894 | 1871 | 1542 | 1670 |
| Tensile Strength @Max | psi | 4234 | 3964 | 4059 | 3995 | 1670 |
| Elongation at Break | % | 730.1 | 720.6 | 737.6 | 738.7 | 326 |
| Tensile Strength at Break | psi | 4233 | 3958 | 4056 | 3993 | |
| Tensile Energy | ft-lb | 28.99 | 17.50 | 13.57 | 9.27 | 1.47 |
| Tensile Toughness | psi | 18120 | 16195 | 17158 | 16825 | 4733 |
| PE_TENSILE (T-Direction) | | | | | | |
| Tensile Modulus | psi | 111550 | 103519 | 85664 | 96012 | 40101 |
| Elongation at Yield | % | 9.5 | 9.7 | 9.9 | 9.5 | 13.7 |
| Tensile Strength at Yield | psi | 2164 | 1828 | 1630 | 1481 | 1616 |
| Tensile Strength @Max | psi | 4079 | 3920 | 3800 | 3778 | 1616 |
| Elongation at Break | % | 756.6 | 748.1 | 763.5 | 754.4 | 81.6 |
| Tensile Strength at Break | psi | 4076 | 3919 | 3798 | 3777 | |
| Tensile Energy | ft-lb | 30.04 | 17.76 | 13.14 | 8.80 | 0.32 |
| Tensile Toughness | psi | 18416 | 17021 | 16299 | 15979 | 1040 |
| INSTRUM_IMPACT (Room Temp) | | | | | | |
| Total Energy | ft-lb | 2.86 | 1.54 | 1.04 | 0.63 | 1.11 |
| Energy to Max Load | ft-lb | 1.84 | 1.03 | 0.71 | 0.42 | 0.8087 |
| Energy After Max Load | ft-lb | 1.02 | 0.51 | 0.33 | 0.21 | 0.3039 |
| Maximum Load | lbf | 107.17 | 67.94 | 50.06 | 32.72 | 58.4 |

TABLE 2-continued

| | | INSTRUM_IMPACT (Room Temp set 2) | | | | |
|---|---|---|---|---|---|---|
| Total Energy | ft-lb | 2.8 | 1.51 | 1.04 | 0.633 | 0.633 |
| Energy to Max Load | ft-lb | 2.32 | 1.19 | 0.82 | 0.46 | 0.46 |
| Energy After Max Load | ft-lb | 0.48 | 0.32 | 0.22 | 0.173 | 0.173 |
| Maximum Load | lbf | 104.23 | 65.39 | 49.08 | 32.03 | 32.03 |
| | | INSTRUM_IMPACT (−20° C.) | | | | |
| Total Energy | ft-lb | 1.64 | 4.22 | 1.82 | 0.96 | 1.71 |
| Energy to Max Load | ft-lb | 1.27 | 3.43 | 1.26 | 0.71 | 1.39 |
| Energy After Max Load | ft-lb | 0.37 | 0.79 | 0.56 | 0.25 | 0.32 |
| Maximum Load | lbf | 68.54 | 97.96 | 67.64 | 47.73 | 96.7 |

Example 2

Extruded Sheets from Single-Site Catalyzed
Polyolefin, Comparative LDPE and Comparative
Six Pack Ring The mPE #1-4 polymer sheet samples of the present invention, comparative LDPE, and commercial six pack ring material were analyzed and compared. Table 3 lists the DSC and density of the samples. The six pack ring showed a density of 0.930 g/cc, which was higher than the density comparative LDPE; indicating that it was a higher density product. The enthalpies are significantly higher. The density of mPE #3 was similar to the six pack ring. From the data it was determined that the polymer sheet of the present invention are suitable for six pack ring production as the density and DSC are comparable to the commercial product.

TABLE 3

| Characteristic | Six Pack Ring | LDPE | mPE#1 | mPE#2 | mPE#3 | mPE#4 |
|---|---|---|---|---|---|---|
| Xtal Temp. (° C.) | 101.3 | 98.4 | 106.4 | 111.5 | 105.3 | 108.2 |
| Xtal Enth. (J/g) | 80.8 | 66.1 | 114.4 | 148.7 | 114.6 | 138.1 |
| Melt Temp. (° C.) | 112.3 | 114.6 | 119.3 | 124.6 | 121.3 | 122.1 |
| Melt Enth. (J/g) | 106.1 | 94.9 | 126.9 | 156.3 | 122.8 | 149 |
| Density (g/cc) | 0.9299 | 0.9238 | 0.9265 | 0.9330 | 0.9297 | 0.9331 |

Rheology testing results of the 6 samples are listed in Table 4. Density was included for reference to total molecular architecture.

TABLE 4

| Characteristic | Six Pack Ring | LDPE | mPE#1 | mPE#2 | mPE#3 | mPE#4 |
|---|---|---|---|---|---|---|
| MI2 (dg/min) | 0.61 | 0.78 | 0.41 | 0.81 | 0.8 | 5.71 |
| HLMI (dg/min) | 50 | 40.8 | 13.5 | 24.5 | 23.3 | 125 |
| SR2 (HLMI/MI2) | 82 | 52.3 | 32.9 | 30.2 | 29.1 | 21.9 |
| Density (g/cc) | 0.9299 | 0.9238 | 0.9265 | 0.933 | 0.9297 | 0.9331 |

Dynamic temperature-frequency sweeps were pursued to further understand the rheological comparisons and are listed in Table 5. These defined Carreau-Yasuda parameters for further optimizing molecular architecture. It was possible to match zero shear viscosity with a mPE sample having a fractional melt index. The shorter relaxation times for the polymer sheets of the present invention indicated they have less melt strength, but in cast sheet this can be compensated for in processing. It can bring some benefits in reducing the amount of rheological stresses frozen into the melt as it is quenched in a cast sheet roll stack.

TABLE 5

| Rheological Characteristic | Six Pack Ring | LDPE #1 | mPE #1 | mPE #3 | mPE #2 | mPE #4 |
|---|---|---|---|---|---|---|
| Zero Shear Visc. (Pa · sec) | 1.06E+05 | 2.67E+04 | 1.03E+06 | 8.54E+04 | 9.49E+04 | 1.79E+03 |
| Relax. Time (sec.) | 1.73E−01 | 6.86E−02 | 9.00E−04 | 8.00E−04 | 5.00E−04 | 9.00E−04 |
| Rheo. Breadth | 0.207 | 0.295 | 0.103 | 0.141 | 0.136 | 0.352 |
| Power Law Index | 0 | 0 | 0 | 0 | 0 | 0 |
| Activation Energy (kJ/mol) | 49.45 | 49.05 | 27.86 | 27.32 | 29.56 | 30.99 |

Another criteria for processing is wax concentration. Higher wax concentration (lower molecular weight species) can lead to a variety of processing challenges. Smokiness, die lip buildup and roll stack buildup are three potential problems. Some processing technologies require special 'grease traps' to collect such low molecular weight material to prevent equipment fouling and downtime.

From the wax testing it was determined that the polymer sheets of the present invention provide an advantage. All four polymer sheets of the present invention tested had significantly less wax than the six pack ring and the LDPE (See, Table 6). The paucity of wax provides the advantage of improved processing, improved physical properties, and lightweighting.

kJ/mol), which is a measure of melt properties temperature sensitivity, (6) higher storage and loss modulus in dynamic-mechanical analysis from torsion, and (7) higher estimated HDT performance. For example, mPE estimated HDT of 147 to 167° C. compared to the LDPE estimated HDT of 133° C. for a threshold of 0.20% strain. Also, the use of the polymer sheets of the present invention provides options to the use of LDPE for six pack ring manufacture. By way of example, the polymer sheets of the present invention had fewer low molecular weight species which is consistent with the low wax results.

Although embodiments of the present application and their advantages have been described in detail, it should be understood that various changes, substitutions and alterations can be made herein without departing from the spirit

TABLE 6

| Characteristic | Six Pack Ring | LDPE | mPE#1 | mPE#2 | mPE#3 | mPE#4 |
|---|---|---|---|---|---|---|
| Wax (%) | 39.2 | 55.9 | 16.1 | 1.4 | 9.2 | 20.4 |
| Density (g/cc) | 0.9299 | 0.9238 | 0.9265 | 0.933 | 0.9297 | 0.9331 |

GPC data were consistent with the wax results. The data is listed in Table 7. Average molecular weights illustrated the molecular weight of the single-site catalyzed polyolefin was narrower. Although this left fewer high molecular weight species, it eliminated many waxy species that do not contribute significantly to physical properties.

and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from

TABLE 7

| Characteristic | Six Pack Ring | LDPE | mPE#1 | mPE#2 | mPE#3 | mPE#4 |
|---|---|---|---|---|---|---|
| Mn | 17121 | 20962 | 38340 | 30870 | 33019 | 21657 |
| Mw | 101834 | 77210 | 98930 | 84995 | 87169 | 57421 |
| Mz | 367485 | 202322 | 198825 | 168717 | 175370 | 112590 |
| Polydispersity | 5.9 | 3.7 | 2.6 | 2.8 | 2.6 | 2.7 |
| Mz/Mw | 3.6 | 2.6 | 2.0 | 2.0 | 2.0 | 2.0 |
| Peak MW | 70111 | 67437 | 69208 | 65711 | 64866 | 45732 |

Figure 9:
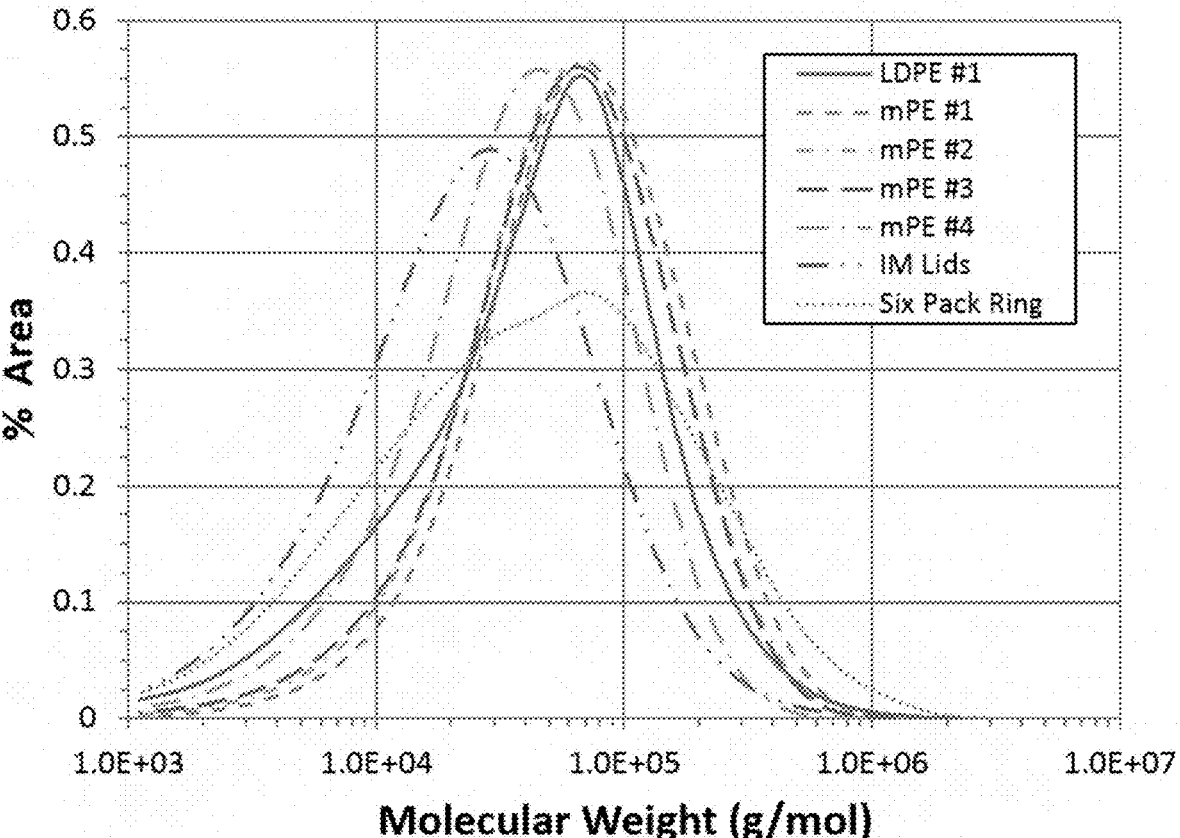
FIG. 9 shows gel permeation data for comparative LDPE sheet, the polymer sheets of the present invention, and a six pack ring holder.

The molecular weight differences are illustrated in an overlay of GPC slice data (See, FIG. 9). The six pack holder had a very broad, nearly bimodal distribution shape. The LDPE comparative had a narrower molecular weight distribution. These differences might be rooted in reactor technologies as it is known that tubular versus autoclave technologies can produce distinct molecular weight architecture.

In summary, the mPE polymer sheets of the present invention exhibited (1) less variation in molecular weight as the polydispersity ranged from 2.6-2.8 for mPE versus 3.7 for LDPE, (2) less wax (1-20%) than the LDPE (55%), (3) less ash content (0.02-0.04%) than the LDPE (0.27%), (4) higher melting points, which increased with increasing density, but decreased with increasing MFI, (5) lower rheological activation energy (27-31 kJ/mol) than the LDPE (49 the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A polymer sheet comprising:
   greater than 0 wt. % and less than 30 wt. % of wax; and
   a single-site catalyzed polyolefin (PO), wherein the sheet has a thickness of at least 0.0254 cm and a density of 0.924 g/mL to 0.942 g/mL.

2. The polymer sheet of claim 1, wherein the PO material comprises a single-site catalyzed polyethylene (PE), a single-site catalyst polypropylene (PP), a copolymer thereof, or a blend thereof.

3. The polymer sheet of claim 2, wherein the polymer sheet comprises 10 wt. % or less of an additional polymer.

4. The polymer sheet of claim 3, wherein the additional polymer is a single-site catalyzed PP, a single-site catalyzed copolymer, a single-site catalyzed plastomer, an elastomer, a non-single site catalyzed polyolefin, or a blend thereof.

5. The polymer sheet of claim 4, wherein the non-single site catalyzed polyolefin is a low density polyolefin material.

6. The polymer sheet of claim 5, wherein the low density polyolefin material is LDPE or LDPP.

7. The polymer sheet of claim 1, wherein the thickness is 0.0254 cm to 0.1 cm.

8. The polymer sheet of claim 1, having a density of 0.924 g/mL to 0.936 g/mL.

9. The polymer sheet of claim 1, having an average tensile modulus of at least 200 MPa.

10. The polymer sheet of claim 1, having an average tensile strength at yield greater than an average tensile strength at yield of a low density polyethylene sheet (LDPE) at the same thickness.

11. The polymer sheet of claim 10, having an average tensile strength at maximum of at least 18.7 MPa.

12. The polymer sheet of claim 11, having an average tensile toughness of 50 MPa to 400 MPa.

13. The polymer sheet of claim 1, wherein the polymer sheet has a thickness of 0.0254 cm and an impact energy at 23° C. of greater than 1.5 kJ/m, greater than 2.5 kJ/m, or at least 3.0 kJ/m.

14. The polymer sheet of any one of claim 1, wherein the polymer sheet has a thickness of 0.0254 cm and an impact energy at −20° C. of 2.5 kJ/m, greater than 3.5 kJ/m, or at least 4.5 kJ/m.

15. The polymer sheet of claim 1, having a % shrinkage≤the % shrinkage of a LDPE sheet of the same thickness under the same conditions.

16. The polymer sheet of claim 1, having a higher energy to maximum load than a LDPE sheet of the same thickness under the same conditions.

17. The polymer sheet of claim 1, wherein the polyolefin comprises less than 25 wt. % wax, less than 15 wt. % wax, less than 10 wt. % wax, or less than 5 wt. % wax, or no wax.

18. The polyolefin sheet of claim 1, having a heat deflection temperature (HDT) performance greater than the HDT of a LDPE sheet of the same thickness under the same conditions.

19. An article of manufacture comprising the polymer sheet of claim 1.

20. The article of manufacture of claim 19, wherein the article of manufacture is a molded material.

21. The article of manufacture of claim 20, wherein the molded material is a multi-container ring holder.

22. The article of manufacture of claim 21, wherein the molded material is an overlid.

* * * * *